United States Patent [19]

Yamazaki

[11] Patent Number: 5,119,085
[45] Date of Patent: Jun. 2, 1992

[54] DRIVING METHOD FOR A LIQUID CRYSTAL PANEL

[75] Inventor: Katsunori Yamazaki, Suwa, Japan

[73] Assignee: Seiko Epson Corporation, Tokyo, Japan

[21] Appl. No.: 650,841

[22] Filed: Feb. 5, 1991

Related U.S. Application Data

[63] Continuation-in-part of Ser. No. 232,750, Aug. 15, 1988, Pat. No. 5,010,326.

[30] Foreign Application Priority Data

| Aug. 13, 1987 | [JP] | Japan | 62-202154 |
|---|---|---|---|
| Feb. 9, 1988 | [JP] | Japan | 63-27922 |
| Feb. 9, 1988 | [JP] | Japan | 63-27923 |
| Feb. 9, 1988 | [JP] | Japan | 63-27924 |
| Feb. 6, 1990 | [JP] | Japan | 2-26415 |

[51] Int. Cl.⁵ ............................................. G09G 3/36
[52] U.S. Cl. .................................... 340/784; 340/805; 340/793; 359/55
[58] Field of Search ............... 340/784, 765, 805, 793, 340/767; 359/55

[56] References Cited

U.S. PATENT DOCUMENTS

| 4,180,813 | 12/1979 | Yoneda | 340/793 |
|---|---|---|---|
| 4,709,995 | 12/1987 | Kuribayashi | 340/793 |
| 5,010,326 | 4/1991 | Yamazaki et al. | 340/784 |

FOREIGN PATENT DOCUMENTS 63159914 1/1990 Japan .

Primary Examiner—Jeffery A. Brier
Attorney, Agent, or Firm—Blum Kaplan

[57] ABSTRACT

A liquid crystal display device for producing a substantially uniform tone pattern by placing in the same display state all display dots producing the tone pattern which are associated with the same scanning electrode during each frame of a cycle. The method further includes adjusting the scanning waveform applied to each scanning electrode during each frame based on the tone pattern. Alternatively, the liquid crystal display device places all display dots which produce the tone pattern in the lit state for the same duration of time during the cycle and concurrently adjusts the scanning waveform applied to each scanning electrode during the cycle based on the tone pattern. Different groups of display dots which produce the tone pattern are placed in the non-lit display state at different portions of the cycle. Voltage disturbances giving rise to spikes and rounding of the voltage pulses occuring on the scanning and signal electrodes are substantially eliminated.

81 Claims, 13 Drawing Sheets

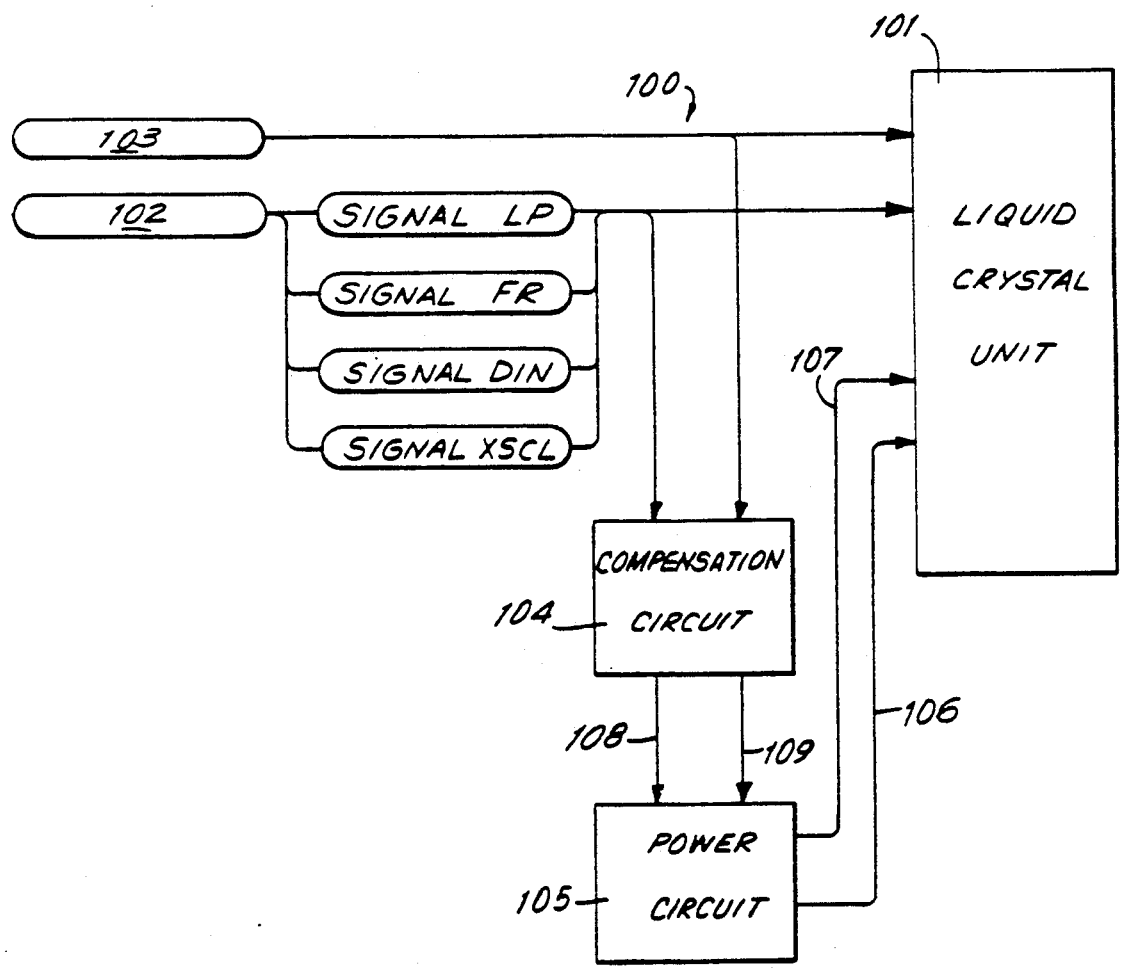

DRIVING METHOD FOR A LIQUID CRYSTAL PANEL

CROSS-REFERENCE TO RELATED APPLICATION

This application is a continuation-in-part of U.S. patent application Ser. No. 07/232,750, filed on Aug. 15, 1988, currently pending.

BACKGROUND OF THE INVENTION

The present invention relates generally to a driving method for a liquid crystal panel, and more particularly to a driving method for producing a substantially uniform tone pattern.

A conventional driving method, commonly referred to as the voltage averaging method, is generally employed for driving a matrix type liquid crystal panel. The voltage averaging method successively applies a selection voltage to each scanning electrode during each frame of a cycle (i.e. period). At the same time that a selection voltage is applied to a scanning electrode (i.e. a selected scanning electrode), a lighting voltage or a non-lighting voltage is applied to each of the signal electrodes. The selection of each scanning electrode and concurrent application of a lighting voltage or non-lighting voltage to each signal electrodes is repeated each frame. A display of lit and unlit dots (pixels) forming a desired pattern on the liquid crystal panel is produced. By providing two or more frames per period and a method for changing which of the dots is to be lit and unlit during each frame, a display with a desired tone (i.e., tone pattern/display) is produced. As used herein, a tone is considered to be a shade of grey that is neither white nor black.

Conventional driving methods also typically invert the polarity of the voltage applied across the liquid crystal panel from frame to frame to prevent application of a DC voltage to the liquid crystal panel.

In another conventional driving method, hereinafter referred to as a first driving method, the display dots associated with the same scanning electrode in forming the tone pattern during each frame are in the same lit or non-lit display state (i.e. the phases of the flickering cycles of each display dot associated with each signal electrode are equalized). The lighting or non-lighting of the display dots within the tone pattern is not based on the position of the signal electrodes. In yet another conventional driving method, hereinafter referred to as the second driving method, the adjacent display dots associated with the same scanning electrode are in different display states, that is, lit and non-lit. Each display dot in the second driving method is based on a position of a signal electrode. In particular, the display states of the display dots associated with a scanning electrode are varied based on the position of the corresponding signal electrodes.

Referring now to FIGS. 1(a) and 1(b), the display contents of a liquid crystal panel for a first frame and a second frame in accordance with the first driving method are illustrated, respectively. For exemplary purposes only, the liquid crystal panel includes a plurality of scanning electrodes Y1–Y10 and a plurality of signal electrodes X1 and X10. Each display dot is associated with the intersection (i.e. overlapping) of one of the plurality of scanning electrodes with one of the plurality of signal electrodes. A symbol ○ represents a non-1 a mark symbol represents a lit display dot. Scanning electrodes Y1–Y10 are selected in ascending numerical order (i.e., Y1–Y10). FIGS. 1(a) and 1(b) illustrate a square using a half tone display positioned at the center of the liquid crystal panel.

The display dots corresponding to the odd numbered scanning electrodes (Y3, Y5, Y7) are not lit during the first frame (FIG. 1a) and lit during the second frame (FIG. 1(b)). The display dots corresponding to the even numbered scanning electrodes (Y4, Y6, Y8) are lit during the first frame and not lit during the second frame. Therefore flickering of the square display is not based on whether the signal electrodes are even numbered or odd numbered since all of the signal electrodes for a particular scanning electrode are of the same phase (i.e., lit or not lit). The first driving method therefore equalizes phases of flickering cycles of display dots generated by the scanning electrodes, for each scanning electrode, without regard to position of any signal electrode.

Referring next to FIGS. 4(a) and 4(b), the display contents of a liquid crystal panel for a first frame and a second frame in accordance with the second driving method is illustrated, respectively. Similar to FIGS. 1(a) and 1(b), the liquid crystal panel includes scanning electrodes Y1–Y10 and signal electrodes X1–X10.

In FIG. 4(a), the display dots produced by the odd numbered scanning electrodes (Y3, Y5, Y7) intersecting with the odd signal electrodes (X3, X5, X7) and the display dots produced by the even numbered scanning electrodes (Y4, Y6, Y8) intersecting with the signal electrodes (X4, X6, X8) are not lit in the first frame - and are lit in the second frame. Alternatively, FIG. 4(a) can be viewed as the display dots produced by the even numbered scanning electrodes (Y4, Y6,Y8) intersecting the odd numbered signal electrodes (X3, X5, X7) and the display dots produced by the odd numbered scanning electrodes (Y3, Y5, Y7) intersecting the even numbered signal electrodes (X4, X6, X8) being lit in the first frame and not lit in the second frame. Flickering of the display contents as shown in FIGS. 4(a) and 4(b) is based on the odd numbered and even numbered signal electrodes having different phases (i.e., out of phase with each other) per frame. In other words, the second driving method varies the phases of flickering cycles of the display dots generated by the scanning electrodes according to the position of the signal electrodes.

The unevenness of the display produced by the first driving method, which results in the aforementioned flicker, arises from crosstalk commonly referred to as zebra crosstalk (i.e., a zebra display pattern). Such unevenness is minimized by employing a driving method such as disclosed in Japanese Patent Application No. 63-159914. When the selected scanning electrode is successively changed, a nonuniformity in the display results. The nonuniformity is based on a parameter I, that is, the difference between the number of display dots currently lit on a selected scanning electrode (hereinafter referred to as the lighting dots) and the number of lighting dots currently lit in the scanning electrode to be selected next. That is, when the selected scanning electrode changes from the n-th scanning electrode to the n+1 th scanning electrode, and where the number of lighting dots on the n-th scanning electrode is Non and the number of lighting dots on the n+1 th scanning electrode is Mon, parameter I is equal to Non − Mon. When I is negative (−), a voltage with one or more spikes is generated on each scanning electrode. The spikes point in the side/direction of the lighting voltage.

When parameter I is positive (+), a voltage with one or more spikes is generated in the non-lighting voltage direction/side based on the magnitude (i.e., absolute value) of parameter I. As can be readily appreciated, for relatively large values of parameter I which last for a relatively long period of time the level of the effective voltage applied to the display can vary significantly based on the voltage spikes. An appreciable increase in nonuniformity of the tone display results.

Referring once again to FIGS. 1(a) and 1(b), the first and second frames which are respectively represented by FIGS. 1(a) and 1(b), represents one cycle (period). The first driving method shown in FIGS. 1(a) and 1(b) requires that all of the display dots within the tone pattern associated with one of the scanning electrodes Y3–Y8 be lit or maintained not lit during each frame. A large value of parameter I results. For example, parameter I equals a value of 6 when the selected scanning electrode is changed from Y4–Y5. A relatively large nonuniform tone display is produced.

As shown in FIGS. 4(a) and 4(b), parameter I using the second driving method is minimized. For example, when the selecting scanning electrode is changed from Y4–Y5, parameter I has a value 0. Production of a nonuniform tone display is substantially avoided. More particularly, when a scanning electrode is selected the charge and discharge rates of the electric charges of the display dots associated with odd numbered signal electrodes is equalized by the charge and discharge rates of the electric charges of display dots associated with the even numbered signal electrodes.

The second driving method nevertheless produces a non-uniform tone display when used to drive a multicolor liquid crystal panel having a filter of three or more colors. Such a panel requires that the electrodes be disposed relatively close to each other. Consequently, an element providing a driving waveform to the panel must be connected to more than one signal electrode. For example, the element is connected alternately to opposite ends (i.e., upper and lower ends) of the signal electrodes to reduce the number of connections of different electrical elements to the signal electrodes. Assembly of a liquid crystal panel based on such connections to the signal electrodes contributes to a nonuniform tone display when using the second driving method.

More particularly, a driving waveform would be applied to the odd numbered signal electrodes (X1, X3, X5, X7, X9) from the top of the panel and to the even numbered signal electrodes (X2, X4, X6, X8, X10) from the bottom of the panel. Application of the driving waveforms to the upper and lower ends of the signal electrodes based on their position in the liquid crystal panel can result in higher charge and discharge rates of the display dots associated with the odd numbered signal electrodes as compared to the charge and discharge rates of the display dots associated with the even numbered signal electrodes. A difference in the charge and discharge rates between the display dots associated with the odd and even numbered signal electrodes results.

The lower charge and discharge rates of the display dots associated with even numbered signal electrodes is based on the significant level of attenuation to the driving waveform. This attenuation is based on the driving waveform being supplied to the lower end of each even numbered signal electrode as compared to the upper end of each odd numbered signal electrode. The magnitude of the driving waveform supplied to the even numbered signal electrodes is attenuated by their resistance and the impedance of other components in the panel. The driving waveform supplied to the odd numbered signal electrodes, however, is slightly, if at all, attenuated since the driving waveform need not travel along the length of the signal electrode before reaching the display dot. The substantial difference in the magnitude of the driving waveform based on the position of the signal electrode produces a relatively large difference in the charge and discharge rates of the display dots associated with the odd numbered and even numbered signal electrodes leading to a nonuniform display when using the second driving method.

In yet another method for driving a liquid crystal panel disclosed in Japanese Patent Application No. 63-159914 and commonly referred to as inversion stringing, a nonuniform tone display can occur. In this method, the polarity of the voltage applied across the liquid crystal panel is inverted when switching from one selected scanning electrode to the next selected scanning electrode. The shape of the waveform undergoing such inversion can change and is based on a parameter F. Parameter F is equal to the difference between the sum of the number of lighting dots on the current selected scanning electrode and the number of lighting dots on the next selected scanning electrode and the number of display dots on a scanning electrode (i.e., the number of signal electrodes).

When parameter F is negative (−), a rounding of the voltage waveform applied to the scanning electrode occurs based on the magnitude (i.e., absolute value) of the parameter F immediately after selection of a scanning electrode is made. When the parameter F is positive (+), one or more spikes in the voltage magnitude of the driving waveform applied to the signal electrodes occurs based on the magnitude (i.e., absolute value) of parameter F. The spikes rise in the direction (side) of the lighting voltage. The level of the effective voltage applied to the display dots due to the spikes in and rounding of the waveforms supplied to the scanning and signal electrodes can significantly vary (i.e., be greatly uneven) resulting in a nonuniform tone display.

The nonuniformity of tone display produced by the liquid crystal panel from these different driving methods leads to appreciable color degradation.

Accordingly, it is desirable to provide a driving method for a liquid crystal panel which produces a uniform tone display without appreciable color degradation. The driving method should correct for nonuniformity in the tone display produced by zebra crosstalk as well as nonuniformity produced at the time of polarity inversion of the driving waveforms.

SUMMARY OF THE INVENTION

Generally speaking, in accordance with the invention, a method for driving a liquid crystal display device for producing a substantially uniform tone pattern includes the steps of placing in the same display state all display dots which are associated with the same scanning electrode in producing the tone pattern during one frame of a cycle and concurrently adjusting the scanning waveform applied to each scanning electrode during the frame based on the tone pattern.

The method substantially eliminates the voltage disturbances which are typically in the form of voltage spikes or rounding of the driving waveforms so as to substantially eliminate any non-uniformity in the tone pattern. The placing of all display dots in the same display state and concurrent adjustment to the scanning waveform are repeated for each frame of the cycle.

The liquid crystal display device includes a plurality of signal electrodes overlapping a plurality of scanning electrodes. The plurality of display dots are arranged in a matrix of rows and columns. Each display dot corresponds to the overlapping of one of the plurality of signal electrodes with one of the plurality of scanning electrodes.

In one feature of the invention, the scanning waveform includes a first voltage group and a second voltage group which are alternately applied during each first cycle. In one embodiment of the invention the first cycle includes a first frame and a second frame. The first voltage group is applied to the scanning electrodes during the first portion of the first frame and the last portion of the second frame. The second voltage group is applied during the last portion of the first frame and the first portion of the second frame. An additional cycle which includes a third frame and a fourth frame applies the second voltage group to the scanning electrodes during the first portion of the third frame and the last portion of the fourth frame. The first voltage group is then applied to the scanning electrodes during the last portion of the third frame and the first portion of the fourth frame . The first and additional cycles are alternately applied. In accordance with one embodiment of the invention, the first and last portions of each frame are equal to one half of that frame.

In another feature of the invention, the adjustment to the scanning waveform occurs when the voltage of the signal waveform changes from a lit to non-lit or from a non-lit to lit level and when the scanning waveform changes from one voltage group to the other voltage group. The first voltage group and second voltage group of the scanning waveform are preferably polarity inversions of each other.

In yet another feature of the invention, the adjustment to the scanning waveform is based on a value selected from the pair of parameters I and F. In adjusting the scanning waveform, compensating (i.e. correcting) voltages are based on the magnitude and plurality of the value selected from the pair of parameters I and F. More particularly, the value of parameter F is selected when the scanning waveform changes from one voltage group to the other voltage group. The value of parameter I is selected when the voltage of the signal waveform changes. The correcting voltages are superposed on the driving waveform which is used to place the display dots associated with the same scanning electrode in the same display state during each frame.

In accordance with another aspect of the invention, a method for driving liquid crystal display for producing a substantially uniform tone pattern includes the steps of placing all display dots which produce the tone pattern in the lit state for the same duration of time during the cycle; and concurrently adjusting the scanning waveform applied to each scanning electrode during the cycle based on the tone pattern; wherein different groups of display dots which produce the tone pattern are unlit at different portions of the cycle.

Accordingly, it is an object of the invention to provide an improved driving method for a liquid crystal panel which provides a substantially uniform tone display.

It is another object of the invention to provide an improved driving method for a liquid crystal panel which prevents nonuniformity from crosstalk produced by a zebra pattern display.

It is still another object of the invention to provide an improved driving method for a liquid crystal panel which prevents nonuniformity during polarity inversion of the driving waveforms.

Still other objects and advantages of the invention will, in part, be obvious and will, in part, be apparent from the specification.

The invention accordingly comprises the several steps and the relation of one or more such steps with respect to each of the others thereof, which will be exemplified in the method hereinafter disclosed, and the scope of the invention will be indicated in the claims.

BRIEF DESCRIPTION OF THE DRAWINGS

For a fuller understanding of the invention, reference is had to the following description taken in connection with the accompanying in which:

FIG. 5 is a block diagram of the liquid crystal display device constructed in accordance with the present invention;

DETAILED DESCRIPTION OF THE PREFERRED EMBODIMENT

This application is a continuation-in-part of U.S. patent application Ser. No. 07/232,750 which discloses a number of driving method for maintaining a uniform tone display. While several of the methods disclosed in the parent application are disclosed herein, those methods not disclosed are incorporated herein by reference thereto.

Figure 1A:
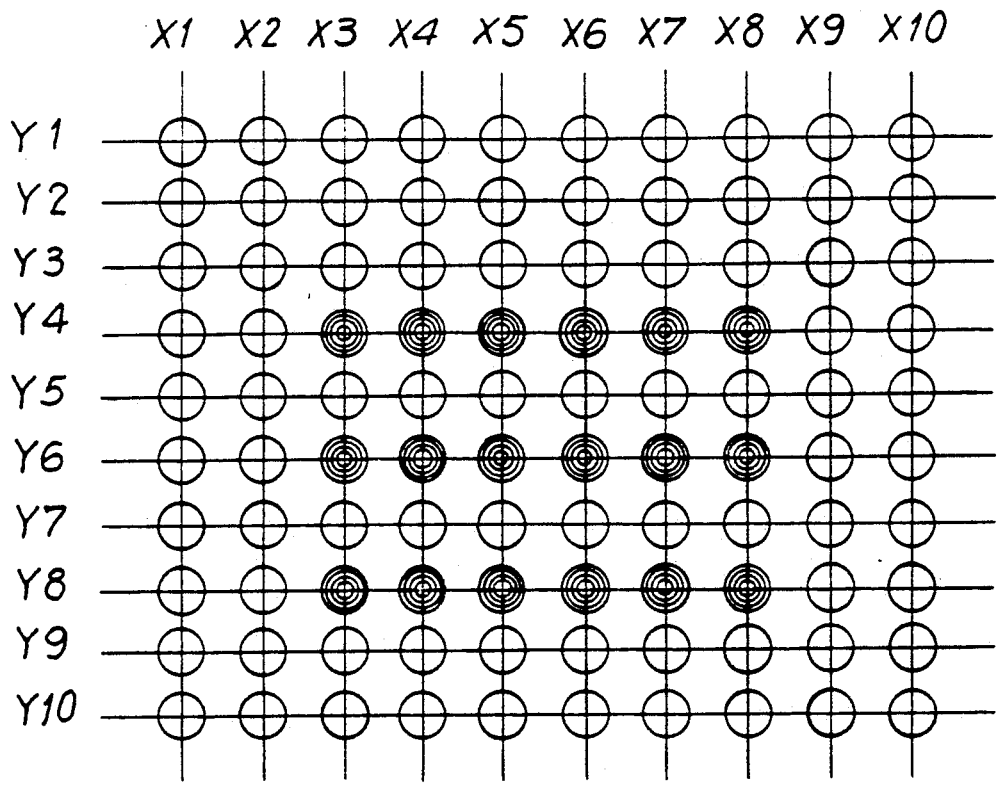
FIGS. 1(a) and 1(b) illustrate diagrammatically the display contents of a liquid crystal panel in accordance with a first embodiment of the invention.
Figure 1B:
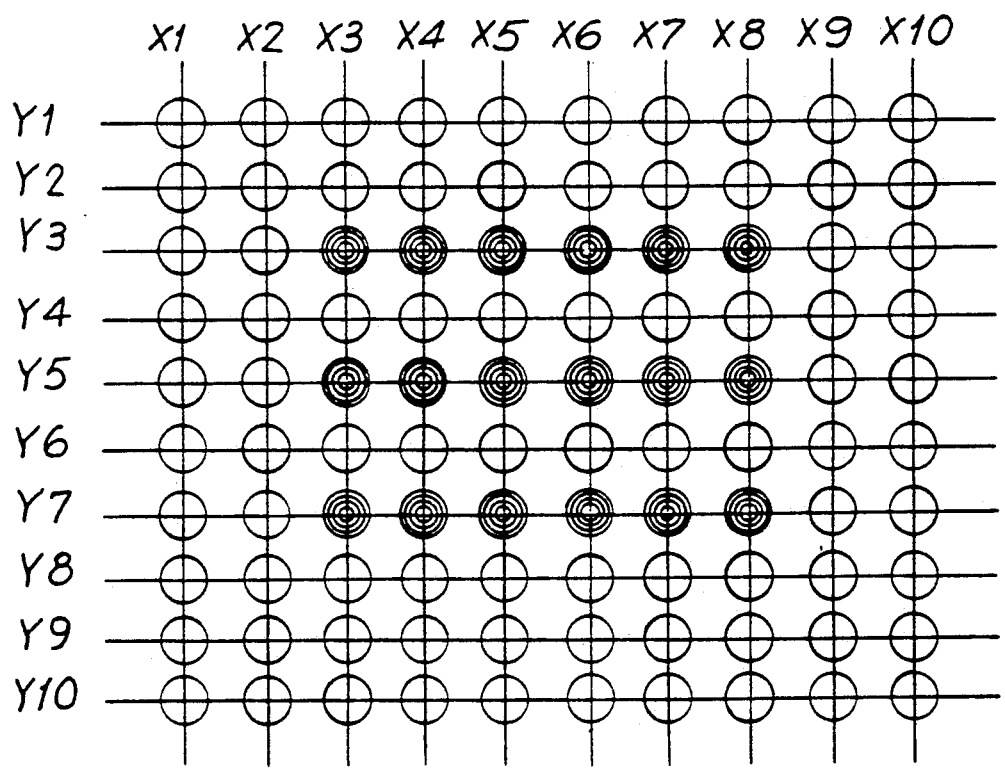

In accordance with a first embodiment of the invention, FIGS. 1(a) and 1(b) illustrate the display patterns of a liquid crystal panel for a first frame and a second frame, respectively. The liquid crystal panel includes a plurality of scanning electrodes Y1-Y10 and a plurality of signal electrodes X1–X10. Preferably, scanning electrodes Y1–Y10 are formed on one of a pair of substrates. The gap between the pair of substrates is filled with a liquid crystal material. Signal electrodes X1–X10 are formed on the other substrate. For exemplary purposes only, only ten (10) scanning electrodes and ten (10) signal electrodes are included in the liquid crystal panel, it being understood that the liquid crystal panel typically includes far more scanning and signal electrodes.

Those portions of the panel where scanning electrodes Y1–Y10 and signal electrodes X1–X10 intersect with each other function as the display dots (pixels). Each display dot marked as an O is a non-lighting dot. Each display dot mark as an ◯ is a lighting dot. The image in FIGS. 1(a) and 1(b) is a centrally positioned, half tone display of a square. The square is surrounded by scanning electrodes Y3–Y8 and signal electrodes X3–X8. The display dots on odd numbered scanning electrodes (Y3, Y5, Y7) are not lit during the first frame and are lit during the second frame. The display dots on even numbered scanning electrodes (Y4, Y6, Y8) are lit during the first frame but not lit during the second frame. Display dots associated with the same scanning electrode flicker in phase with each other. The foregoing driving method, which produces two frames per period, equalizes the phases of the flickering cycles of the display dots generated by the scanning electrodes at each scanning electrode without regard to the position of the signal electrodes.

In accordance with the invention, a correction voltage is superposed on the driving waveform supplied to the scanning electrodes Y1–Y10 (hereinafter referred to as the scanning voltage waveform or scanning waveform) or on the driving waveform supplied to the signal electrodes X1 to X10 (hereinafter referred to as the signal voltage waveform or signal waveform). A method for producing correction voltages is disclosed in examples 1–6 of Japanese Patent Application No. 63-159914. In the present invention, a correction voltage in the driving waveform is (i.e., a correction method) provided by supplying a constant correction non-selecting voltage rather than the uncorrected non-selecting voltage for a period of time based on parameter I.

Figure 2A:
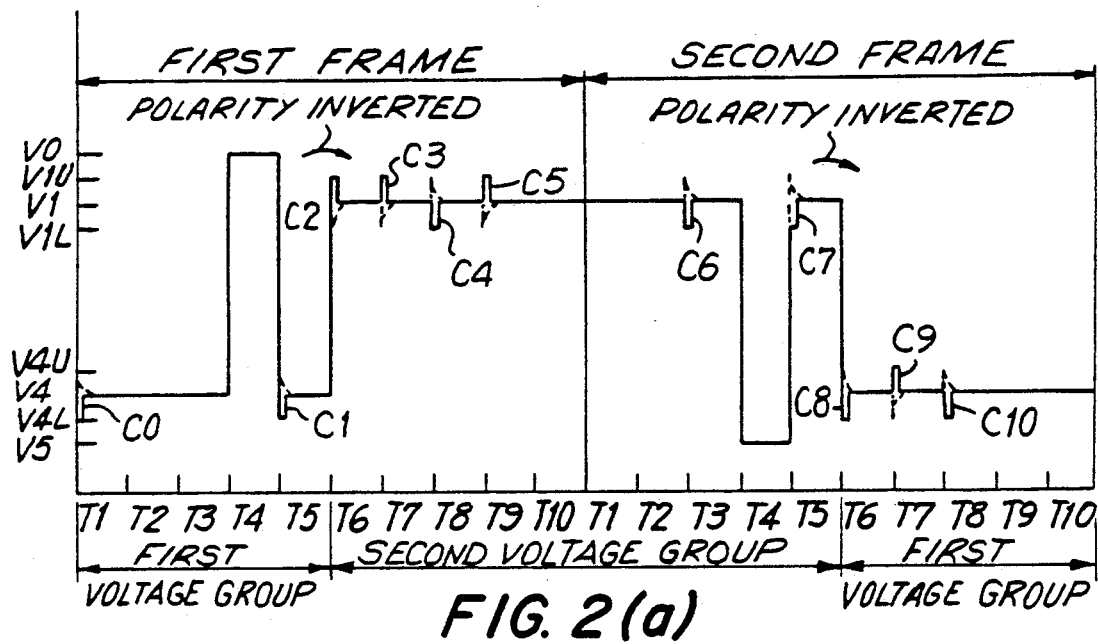
FIGS. 2(a) and (b) graphically illustrate a scanning voltage waveform and a signal voltage waveform during a first cycle in accordance with the invention, respectively.
Figure 2B:
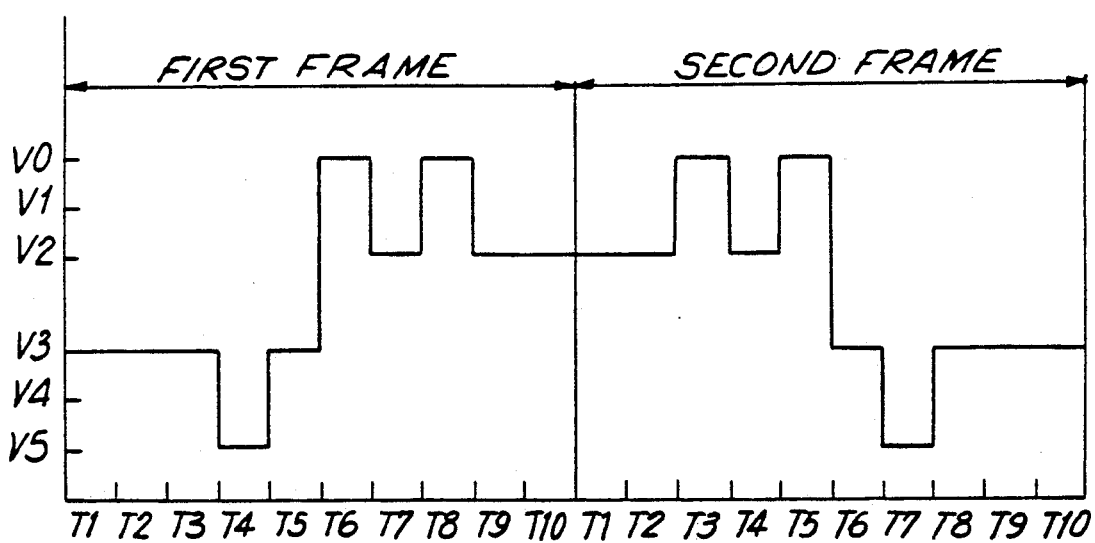
FIGS. 2(c) and 2(d) graphically illustrate a scanning voltage waveform and a signal voltage waveform during a second cycle in accordance with the respectively.

Referring now to FIGS. 2(a) and 2(b) when parameter I is negative (−) and the polarity of the selected scanning voltage is not inverted, the correction non-selecting voltages (V4U, V1L) provided on the non-lighting voltage side of the scanning waveform (i.e., which will not cause the display dot to be lit) are supplied to each scanning electrode instead of the uncorrected non-selecting voltage for a period of time based on the absolute value of parameter I. When parameter I is positive (+), the correction non-selecting voltages (V4L, V1U), which are on the lighting voltage side, are applied to each scanning electrode instead of the uncorrected non-selecting voltage for a period of time according to the absolute value of parameter I.

When the polarity of the voltage applied to the liquid crystal panel is inverted as the selected scanning electrode is being changed from Yn to Yn+1, superposition of a correction voltage to the scanning voltage waveform which is applied to the which is applied to the signal electrodes X1–X10 is based on parameter F (i.e., deducting the number of signal electrodes X1–X10 from the sum of lighting dots on the scanning electrode Yn and lighting dots on the scanning electrode Yn+1). A driving method for producing correction voltages when the polarity of the driving waveform is inverted is described in examples 12–14 of Japanese Patent Application No. 63-159914. In the present invention, a correction voltage is used as part of the driving waveform. More particularly, a constant correction non-selecting voltage rather than an uncorrected non-selecting voltage is supplied for a period of time based on the parameter F.

When parameter F is positive (+) and the polarity of the selected scanning voltage applied to the liquid crystal panel is inverted, the correction non-selecting voltages (V4U, V1L) provided on the non-lighting voltage side are applied to each scanning electrode rather than the uncorrected non-selecting voltage for a period of time based on an absolute value of parameter F. When parameter F is negative, the correction non-selecting voltages (V4L, V4U) provided on the lighting voltage side are applied to each scanning electrode rather than the uncorrected non-selecting voltage for a period of time according to the absolute value of parameter F.

The two correction methods (i.e. methods for changing a driving waveform to drive the liquid crystal panel according, in part, to display patterns) are used at the same time. The voltage waveforms for the driving methods in accordance with the invention are shown in FIGS. 2(a) and 2(b). The solid line of FIG. 2(a) illustrates the scanning voltage waveform including a plurality of correction voltages C0–C10 applied to the scanning electrode Y4 for displaying the contents of the liquid crystal panel shown in FIGS. 1(a) and 1(b). FIG. 2(b) illustrates the signal voltage waveform applied to the signal electrode X5 for displaying the contents of the liquid crystal panel shown in FIGS. 1(a) and 1(b). The broken lines in the voltage waveform of FIG. 2(a) represent a disturbance (e.g., a voltage spike or rounding off) in the driving waveform applied to scanning electrode Y4 at the intersection with signal electrode X5. In FIGS. 2(a) and 2(b) the correction voltages C0–C10 are used rather than the uncorrected scanning voltage to compensate and substantially eliminate the adverse affect of the disturbances on the tone display. The ordinates and abscissas in FIGS. 2(a) and 2(b) indicate units of voltage and units of time, respectively.

Voltages applied to the scanning electrode and signal electrode include a first group and a second group of voltages. In driving the liquid crystal display device, voltages from the first group and second group are alternatively applied.

In FIGS. 2(a) and 2(b), the first voltage group is applied during time intervals T1–T5 of the first frame and during time intervals T6–T10 of the second frame. The second voltage group is applied from time interval T6 of the first frame through time interval T5 second frame. Time intervals T1–T10 correspond to the selection of scanning electrodes Y1–Y10, respectively.

The voltages from the first group and second group, which serve as the selecting and non-selecting levels to be applied to the scanning electrode and the lighting and non-lighting levels to be applied to the signal electrode, are set forth in the following table:

|  | Voltage for the scanning electrode | | Voltage for the signal electrode | |
| --- | --- | --- | --- | --- |
|  | Selecting Voltage | Non-Selecting Voltage | Lighting Voltage | Non-Lighting Voltage |
| First Voltage | V0 | V4 (V4L, V4U) | V5 | V3 |

-continued

| | Voltage for the scanning electrode | | Voltage for the signal electrode | |
|---|---|---|---|---|
| | Selecting Voltage | Non-Selecting Voltage | Lighting Voltage | Non-Lighting Voltage |
| Group Second Voltage Group | V5 | V1 (V1U, V1L) | V0 | V2 |

Voltages V1U, V1L are correction non-selecting voltages for voltage V1 and voltages V4U, V4L are correction non-selecting voltages for non-selecting voltages V4. The levels of the voltages in these two groups are chosen such that:

$$\begin{aligned} V &= V0 - V1 \\ &= V1 - V2 \\ &= V3 - V4 \\ &= V4 - V5 \\ &= a(V1U - V1) \\ &= b(V1 - V1L) \\ &= b(V4U - V4) \\ &= a(V4 - V4L) \end{aligned}$$

$a, b \geq 1$.

The selecting, non-selecting, lighting and non-lighting voltages of each voltage group are changed cyclically. Application of a DC voltage to the liquid crystal panel is therefore avoided. During one period which includes the first frame and second frame, the driving voltages are initially supplied by the first voltage group while scanning electrodes Y1-Y5 of the first frame are selected. The driving voltages are then supplied by the second voltage group while scanning electrodes Y6-Y10 of the first frame and scanning electrodes Y1-Y5 of the second frame are consecutively selected. The driving voltages are then once again supplied by the first voltage groups while scanning electrodes Y6-Y10 are selected.

Figure 2C:
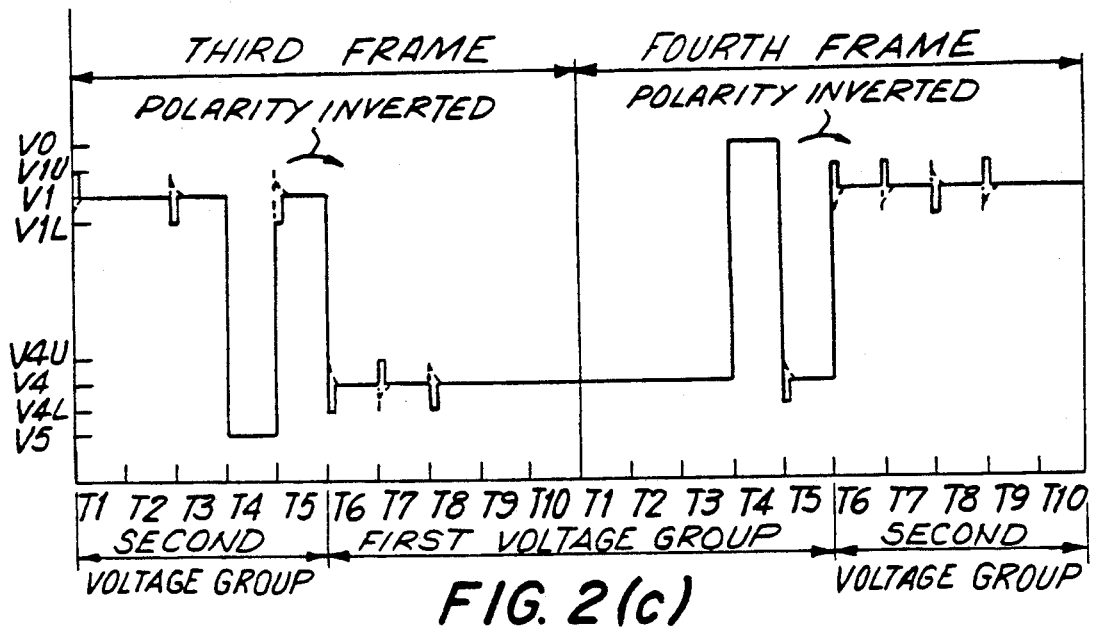
Figure 2D:
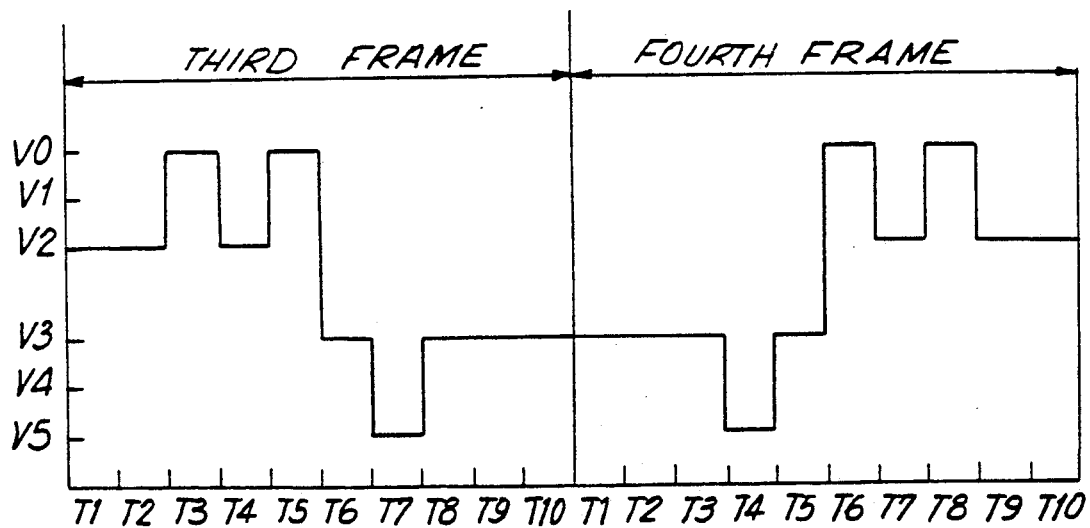

During the next cycle, shown in FIGS. 2(c) and 2(d), the first voltage group and second voltage group are substituted for each other during third and fourth frames. From T1 to T5 of the third frame, waveforms are formed with the second voltage group of voltages (V1 and V5). During time intervals T6 to T10 of the third frame, waveforms are formed with the first voltage group (V0 and V4). From time interval T1 to time interval T5 of the fourth frame, waveforms are formed with the first voltage group. During time intervals T6 to T10, waveforms are formed with the second voltage group. In repeating these cycles (from the first frame to the fourth frame), the voltage which is V1 at T10 of the fourth frame is changed to V4 at T1 of the first frame of the next new cycle. In other words, as the new cycle begins, a polarity inversion of the scanning waveform results.

Each driving waveform from T1-T5 of the third frame is formed from the second voltage group while scanning electrodes Y1-Y5 are selected. Each driving waveform from T6 of the third frame through T5 of the fourth frame is formed from the first voltage group while scanning electrodes Y6-Y10 in the third frame and scanning electrodes Y1-Y5 of the fourth frame are consecutively selected. The driving waveforms are then once again formed by the second voltage group while scanning electrodes Y6-Y10 in the fourth frame are selected. This method of alternating the first voltage group with the second voltage group during each period and then replacing the first voltage group and second voltage group with each other during the next period is repeated for every two periods (cycles) thereafter. The liquid crystal display over two consecutive periods therefore includes four frames. The method as described above substantially prevents a DC voltage from being applied to the liquid crystal panel.

In accordance with the invention, the number of times and time interval that the first group and second group are used within one period may be changed as desired provided that such changes do not result in application of a DC voltage to the liquid crystal panel.

Referring once again to FIGS. 1(a) and 1(b), parameter I and F at the time that one of scanning electrodes Y1-Y10 is selected during the first period is as follows:

First Frame

When changing selection from scanning electrode Y1 to Y2:

I=0 (F=-10)

When changing selection from scanning electrode Y2 to Y3:

I=0 (F=-10)

When changing selection from scanning electrode Y3 to Y4:

I=-6 (F=-4)

When changing selection from scanning electrode Y4 to Y5:

I=6 (F=-4)

When changing selection from scanning electrode Y5 to Y6:

I=(-6) F=-4

When changing selection from scanning electrode Y6 to Y7:

I=6 (F=-4)

When changing selection from scanning electrode Y7 to Y8:

I=-6 (F=-4)

When changing selection from scanning electrode Y8 to Y9:

I=6 (F=-4)

When changing selection from scanning electrode Y9 to Y10:

I=0 (F=-10)

When changing selection from scanning electrode Y10 to Y1 of the second frame:

I=0 (F=-10)

Second Frame

When changing selection from scanning electrode Y1 to Y2:

I=0 (F=-10)

When changing selection from scanning electrode Y2 to Y3:

I=-6 (F=-4)

When changing selection from scanning electrode Y3 to Y4:

I = 6 (F = −b 4)

When changing selection from scanning electrode Y4 to Y5:

I = −6 (F = −4)

When changing selection from scanning electrode Y5 to Y6:

I = (6) F = −4

When changing selection from scanning electrode Y6 to Y7:

I = 6 (F = −4)

When changing selection from scanning electrode Y8 to Y9:

I = 0 (F = −10)

When changing selection from scanning electrode Y9 to Y10:

I = 0 (F = −10)

When changing selection from scanning electrode Y10 to Y1 of the first frame:

I = (0) F = −10

The values of parameter I and F during each change in selecting a scanning electrode which are not in parenthesis are used in determining the correction voltage, if any, to be applied to the scanning electrode to be selected. More particularly, at the time that the selected scanning electrode is changed the driving waveform remains within the same voltage group (i.e., first or second voltage group) and is referred to herein as the polarity not being inverted. The correction voltage to be applied is based on parameter I. When the driving waveform at the time that the selecting scanning electrode is changed switches from the first voltage group to the second voltage group or from the second voltage group to the first voltage group—hereinafter referred to as being polarity inverted—a correction voltage is applied based on parameter F. These disturbances (e.g., voltage spikes and rounding off) to the driving waveforms are represented in FIG. 2(a) by the broken lines. Correction voltages C0-C10 are used to substantially eliminate the affect of the disturbances created by crosstalk (e.g. zebra crosstalk).

Accordingly, when the select scanning electrode is changed and no polarity inversion (i.e. switching) of a voltage group occurs (i.e. when the time interval changes from T4 to T5, T6 to T7 to T8, T8 to T9 in either the first frame or the second frame), a non-lighting correction voltage C1 or C7, C3 or C9, C4 or C10 according to whether parameter I is positive (+) or negative (−) will be generated, respectively. These correction voltages are used to minimize disturbances of voltage spikes or rounding of the driving waveform according to an absolute value of parameter I which occur on the lighting voltage side (i.e., on the side of driving waveform for lighting the display dot). The correction non-selecting voltages C1 at level V4L and C3, C5 at level V1U and C4, C6 at level V1L are provided on the non-lighting side. The correction non-selecting voltages rather than the uncorrected non-selecting voltages are applied to their corresponding scanning electrodes according to whether parameter I is positive (+) or negative (−) for a period of time according to the absolute value of parameter I. Consequently, the disturbances in the driving waveforms are substantially offset.

Similarly, when the voltage groups are switched (i.e., polarity inverted) as indicated by the broken lines for time interval T1 of the first frame and when the time interval changes from T5 to T6 in either the first frame or the second frame, a disturbance in the waveforms will be compensated for based on a correction voltage (C0, C2, C8) determined by the absolute value of parameter F. The direction of the correction voltage (i.e., on the lighting or non-lighting voltage side) is based on whether parameter F is positive (+) or negative (−). The correction non-selecting voltages at levels of V4U, V1L provided on the non-lighting voltage side and the correction non-selecting voltages at levels of V4L, V1U provided on the lighting side are applied to each of the scanning electrodes Y1-Y10 according to whether parameter F is positive (+) or negative (−) for a period of time according to the absolute value of parameter F instead of the uncorrected non-selecting voltage. The disturbances in the driving waveforms are therefore substantially offset resulting in a uniform tone display.

As can now be readily appreciated, the scanning voltage waveform with the correction voltages applied thereto, as indicated by the solid line of FIG. 2(a), is formed according to the parameter I and F. The correction non-selecting voltages included in the driving waveforms are of a sufficient time duration, magnitude and direction to offset any disturbances which occur in the driving waveform. Consequently, a driving waveform is applied to the display dots which produces a substantially uniform tone display.

The foregoing embodiment of the invention includes two frames for each period. A tone display is achieved by lighting certain display dots in one frame and maintaining these same display dots in a non-lit state in the next frame. The tone display can be expressed by a value obtained from dividing the number of times in which a frame is lit by the number of frames in one period. For example, in FIGS. 1(a) and 1(b), the tone is equal to a value of ½ (i.e., half tone). In accordance with the invention other values of tone quality can be realized.

Figure 3A:
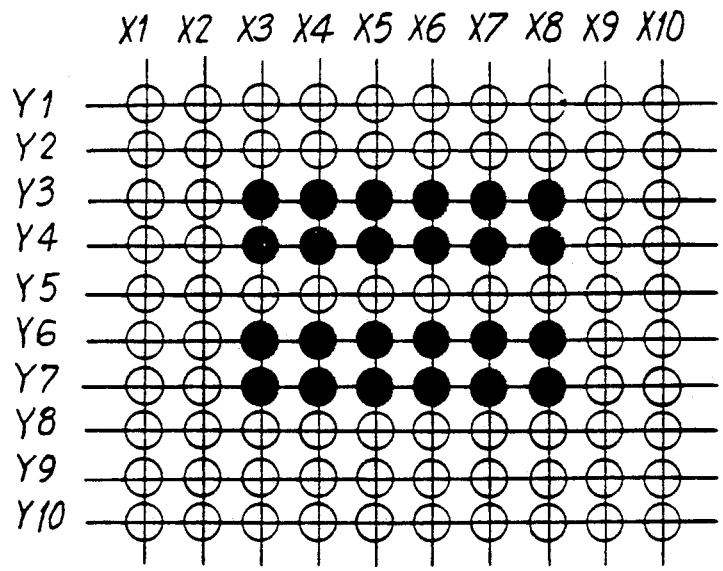
FIGS. 3(a), 3(b) and 3(c) diagrammatically illustrate the display contents of a liquid crystal panel in accordance with a second embodiment of the invention.
Figure 3B:
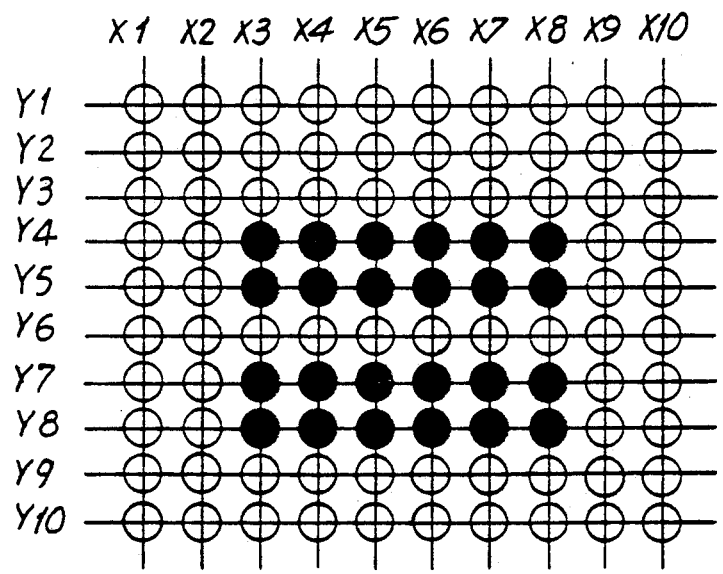
Figure 3C:
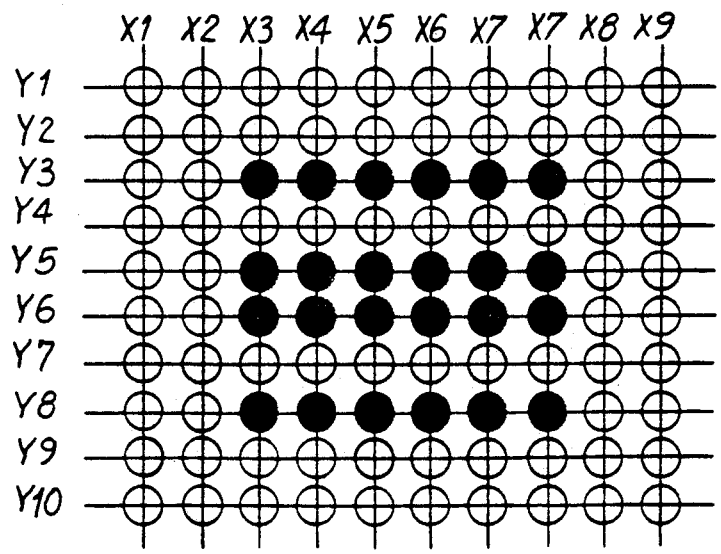
Figure 4A:
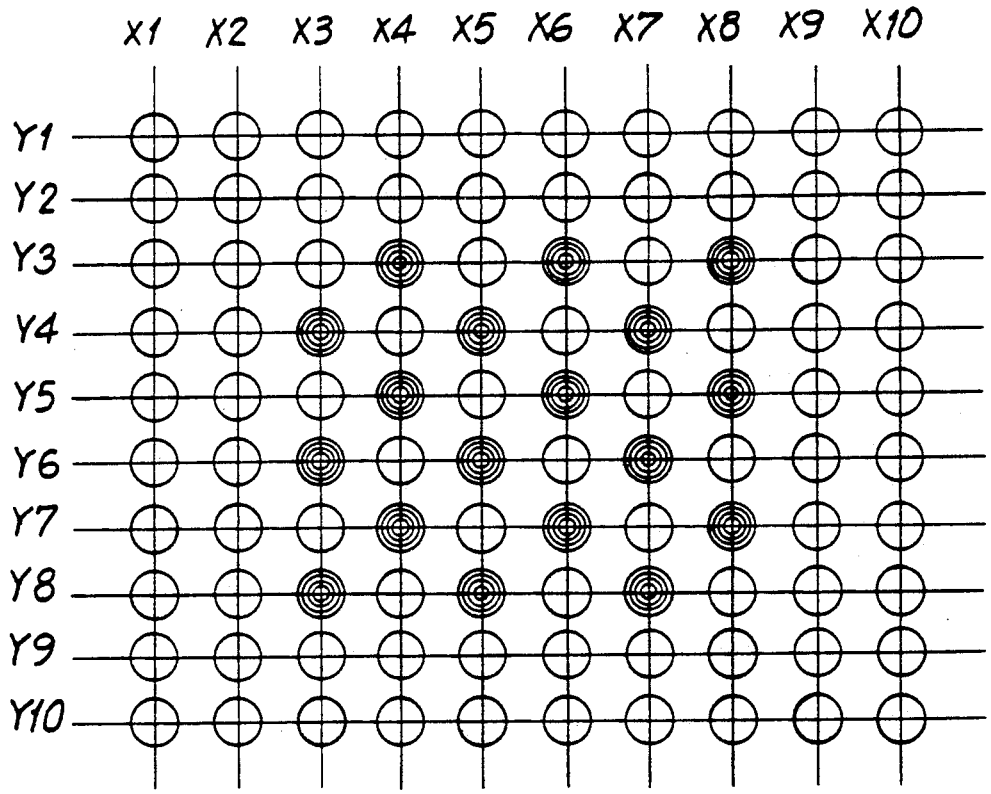
FIGS. 4(a) and 4(b) illustrate the display contents of a liquid crystal panel in accordance with another driving method.
Figure 4B:
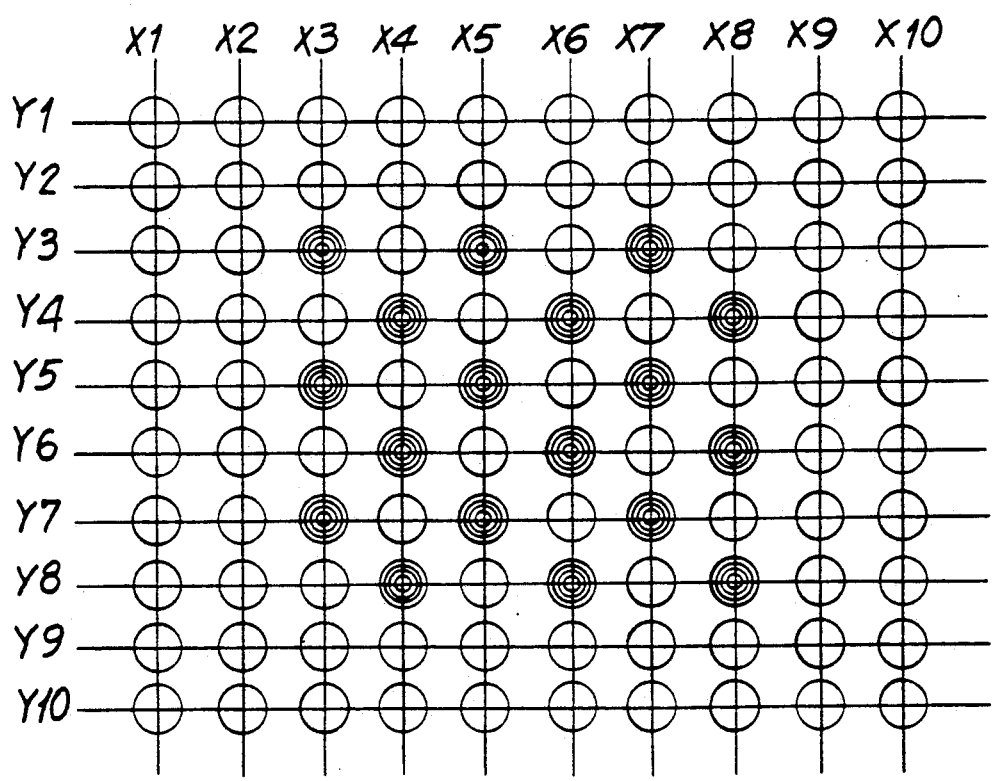

FIGS. 3(a), 3(b) and 3(c) illustrate an alternative embodiment for a tone value of ⅔. FIGS. 3(a), 3(b) and 3(c) are display patterns of first, second and third frames, respectively, of the same liquid crystal panel as shown in FIGS. 1(a) and 1(b). The image displayed is a square which is centrally positioned. In the first frame, the display dots which are lit are on scanning electrodes (Y3, Y6) divisible by 3 and are on scanning electrodes (Y4, Y7) divisible by 3 with a remainder of 1. In the second frame, the display dots which are lit are on scanning electrodes (Y4, Y7) divisible by 3 with a remainder of 1 and are on scanning electrodes (Y5, Y8) divisible by 3 with a remainder of 2. In the third frame, the display dots which are lit are on scanning electrodes (Y3, Y6) divisible by 3 and are on scanning electrodes (Y5, Y8) divisible by 3 with a remainder of 2. Similar to the previous embodiment shown in FIGS. 1(a) and 1(b) and FIGS. 2(a), 2(b), 2(c) and 2(d), a tone display using three frames as one period can be produced in accordance with the invention by placing in the same display state all display dots which are associated with the same scanning electrode in producing the tone pattern during one frame of the cycle and adjusting the scanning waveform applied to each scanning electrode during the frame based on the tone pattern. These steps are repeated for each frame of the period.

The adjustment to the scanning waveform superposes a correction voltage on the scanning voltage waveform or the signal voltage waveform based on parameter I or parameter F. More particularly, based on the magnitude and plurality of parameter I or parameter F, the duration and direction of the correcting voltage can be determined so as to substantially compensate for the voltage disturbance created by switching from one voltage group to the other voltage group or by changing the voltage magnitude of the signal waveform when changing display states (i.e., lit, non-lit). A substantially uniform tone display is produced wherein the tone value is equal to $\frac{2}{3}$. A tone display with a substantially darker shade of color is obtained as compared to the previous embodiment in which two rather than three frames were used during each period.

Reference is now made to FIGS. 5-12 in which a liquid crystal display device (LCD), generally indicated as 100, for eliminating zebra crosstalk is provided. As mentioned above, the degree of zebra crosstalk is based upon the parameter I ($I = N_{ON} - M_{ON}$) between the number of ON dots $N_{ON}$ on the scanning (common) electrode which is to be selected next and the number of ON dots $M_{ON}$ on the scanning electrode which is presently selected. Accordingly, during operation of the liquid crystal display device, a waveform compensation value based upon the value of parameter I must be calculated to eliminate zebra crosstalk.

To make this compensation, LCD 100 includes a liquid crystal unit 101 having a liquid crystal panel and corresponding driving circuit. A combined control signal 102 for controlling the liquid crystal display device composed of a plurality of signals including a latch signal LP, a frame signal FR, a data-in signal DIN, an X driver shift clock signal XSCL and others (not shown) is input into liquid crystal unit 101. A data signal 103 is also input in liquid crystal unit 101.

LCD 100 also includes a waveform compensation signal generating compensation circuit 104 which receives control signal 102 and data signal 103. Compensation circuit 104 calculates the value of parameter I and transmits a sign signal 108 indicating the sign of parameter I and a strength signal 109 indicating the absolute value of parameter I. Strength signal 109 is in an active condition during the period corresponding to the absolute value of parameter I.

A power circuit 105 receives strength signal 109. Power circuit 105 produces a common electrode driving power source (Y power source) 106, supplying voltage to liquid crystal unit 101 in accordance with sign signal 108 and the strength signal 109. Simultaneously, power source 105 produces a segment (signal) electrode driving power source (X power source) 107. Power circuit 105 also performs the voltage compensation of Y power source 106.

Operation of LCD 101 is as follows. Compensation circuit 104 first receives data signal 103 during the period when a scanning electrode is selected. Compensation circuit 104 calculates the number of ON dots $N_{ON}$ on the scanning electrodes presently selected and the number of ON dots $M_{ON}$ on the scanning electrode which is to be selected next, and the difference between the number of ON dots $N_{ON}$ on the scanning electrode which is presently selected and the number of ON dots $M_{ON}$ on the scanning electrode (i.e. the value of parameter I). When the switch is made between successive selected scanning electrodes, the resulting sign and absolute value of parameter I are output as sign signal 108 and strength signal 109, respectively. At the same time, the received $M_{ON}$ value is stored as the number of ON dots, $N_{ON}$, on the scanning electrode which is presently selected. Power circuit 105 compensates the voltage of Y power source 106 in accordance with sign signal 108 and strength signal 109.

Due to the above operation, the display unevenness resulting from the zebra crosstalk on the liquid crystal panel can be prevented. To compensate the applied voltage, a predetermined voltage is applied to the spike shaped noise generated in the driving waveform applied to the liquid crystal panel in a direction which cancels the noise for a period corresponding to the strength of the noise. The direction of the predetermined voltage is determined by sign signal 108, while the period for using the predetermined voltage is determined by strength signal 109.

Figure 6:
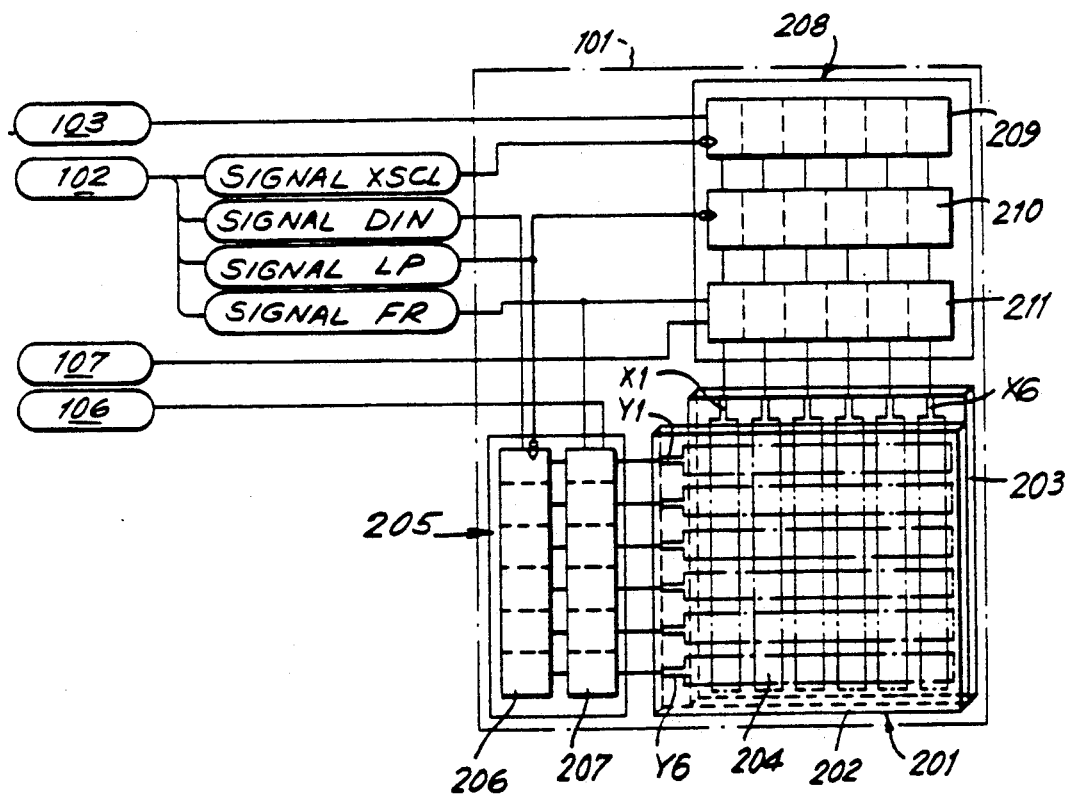
FIG. 6 is a schematic diagram of a liquid crystal unit constructed in accordance with the invention.

As seen from FIG. 6 liquid crystal unit 101 includes a liquid crystal panel 201, having a plurality of scanning electrodes Y1 through Y6 horizontally oriented on substrate 202 and a plurality of signal electrodes X1 through X6 vertically oriented on a substrate 203. A liquid crystal layer 215 is sandwiched between substrates 202 and 203. Scanning electrodes Y1 through Y6 and signal electrodes X1 through X6 intersect each other, forming a display dot 204 at each intersection, forming a crystal panel having a 6 × 6 dot structure. This size is by way of example for ease of explanation, the size of liquid crystal panel 201 may be larger (e.g. as shown in FIGS. 1(a), 1(b), 4(a) and 4(b)) or smaller.

A common electrode driving circuit 205 comprises a shift register circuit 206 and a level shifter circuit 207. Shift register circuit 206 receives signal DIN and provides an output to level shifter circuit 207. Level shifter 20 also receives signal FR and power signal 106 as inputs. The output from level shifter circuit 207 is introduced to each scanning electrode Y1 through Y6 of liquid crystal panel 201.

A segment (signal) electrode driving circuit 208 comprises a shift register circuit 209, a latch circuit 210 and a level shifter circuit 211. Shift register circuit 209 receives signal XSCL and data signal 103 and provides an output to latch circuit 210. Latch circuit 210 also receives signal DIN and provides an output to level shifter circuit 211. Level shifter circuit 211 also receives signal FR and power signal 107 as inputs. The output from level shifter circuit 211 is introduced to each signal electrode X1 through X6 of liquid crystal panel 201.

Figure 7:
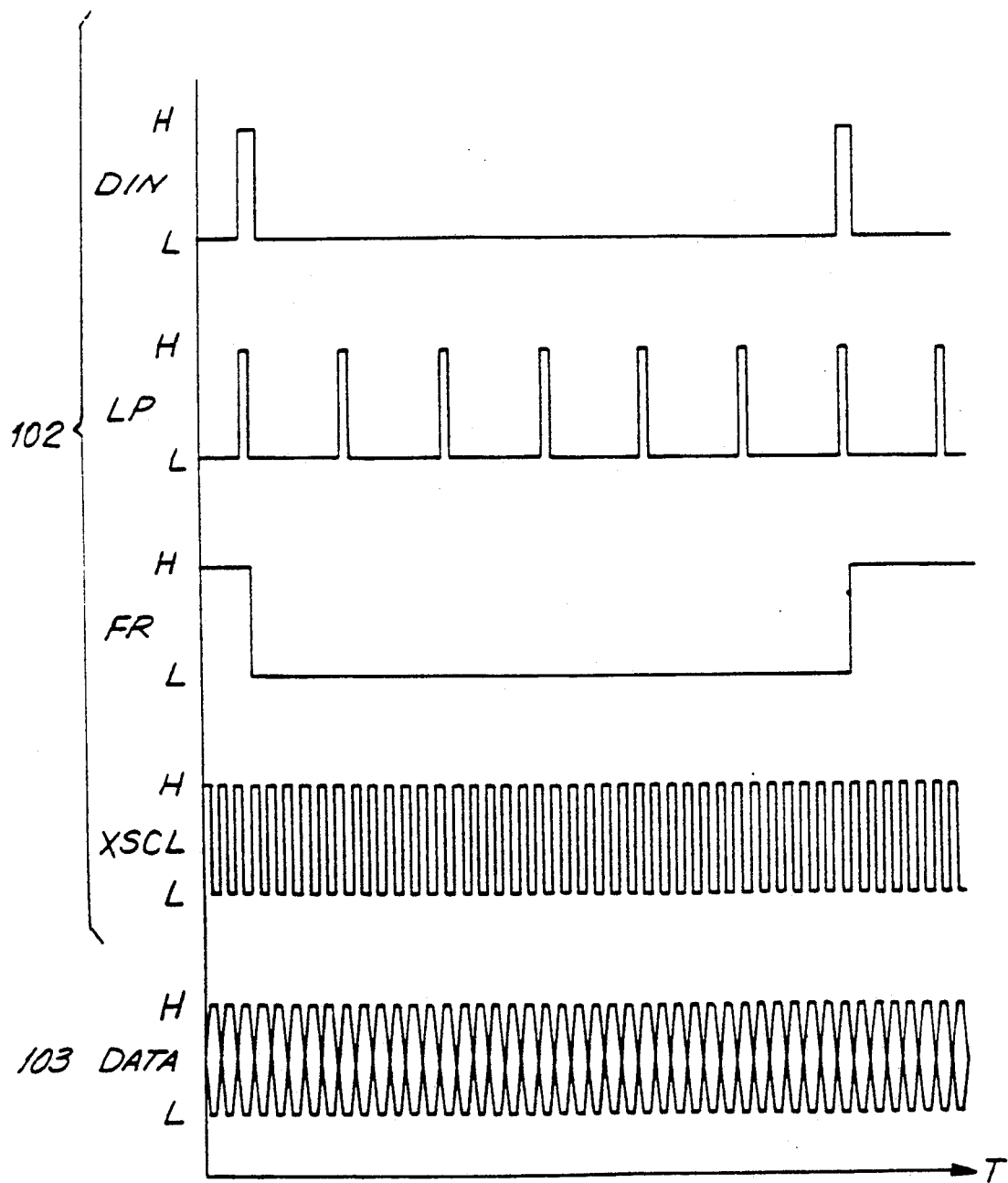
FIG. 7 is a timing chart for the control signal and the data signal in accordance with the present invention.

Reference is now made to FIG. 7 wherein a timing chart showing each signal DIN, LP, FR, XSCL of the control signal 102 and the data signal 103 is provided. Signals DIN and LP act as the data clock and shift clock, respectively, for shift register circuit 206 of common electrode driving circuit 205. Signal DIN is input to shift register circuit 206 at the falling edge of signal LP triggering the transmission of signal DIN.

Signal DIN has "H" as an active element, i.e., when signal DIN is generated. Signal DIN is sequentially output over an interval corresponding to the number of scanning electrodes Y1 through Y6 of liquid crystal panel 201 or a number of occurrences of the signal LP larger than the number of scanning electrodes Y1 through Y6 in the normal case. The "H" data passes through shift register circuit 206, while the "L" data passes through the others. Depending upon the content of shift register circuit 206, the selected voltage is supplied to scanning electrodes Y1 through Y6 by level shifter circuit 207 during an active period and the non-selected voltage is supplied to scanning electrodes Y1 through Y6 during the passive period. The selected voltage and the non-selected voltage are supplied from Y power source 106.

Data signal 103 and signals XSCL and LP act as the data and shift clock of shift register circuit 209 of segment electrode driving circuit 208, and the latch clock of latch circuit 210. Data signal 103 acts as a signal for determining whether display dot 204 on the next scanning electrode to be selected is ON or OFF during the period when the scanning electrode of the liquid crystal panel 201 is selected. Data signal 103 indicates the ON state. Data signal 103 is received in shift register circuit 209 at the falling edge of signal XSCL. Data signal 103 thus corresponds to the display dots on the scanning electrode which is next to be selected during the period when a scanning electrode is presently selected. When the receipt of data signal 103 in accordance with the signal XSCL is terminated the contents of shift register circuit 209 is received in latch circuit 210 at the falling edge of signal LP. Then, in the active case, the ON voltage is supplied to signal electrodes X1 through X6 by shift register circuit 211. Conversely, in the passive case, the OFF voltage is supplied to the signal electrodes X1 through X6. The ON voltage and OFF voltage are supplied by X power source 107.

Additionally, signal FR (frame signal) is input to driving circuits 205, 208 to achieve alternating driving of liquid crystal panel 201. Signal FR switches in response to the falling edge of signal LP, and switches the selection of the potential of the driving voltage. Namely, the driving voltage includes two sets of selected and non-selected voltages, and ON and OFF voltages, which are switched by frame signal FR.

The above structure of the liquid crystal unit 101 and the driving method therefor is only by way of example for explaining the present invention. The structure of liquid crystal unit 101 is not limited to the structure.

Figure 8:
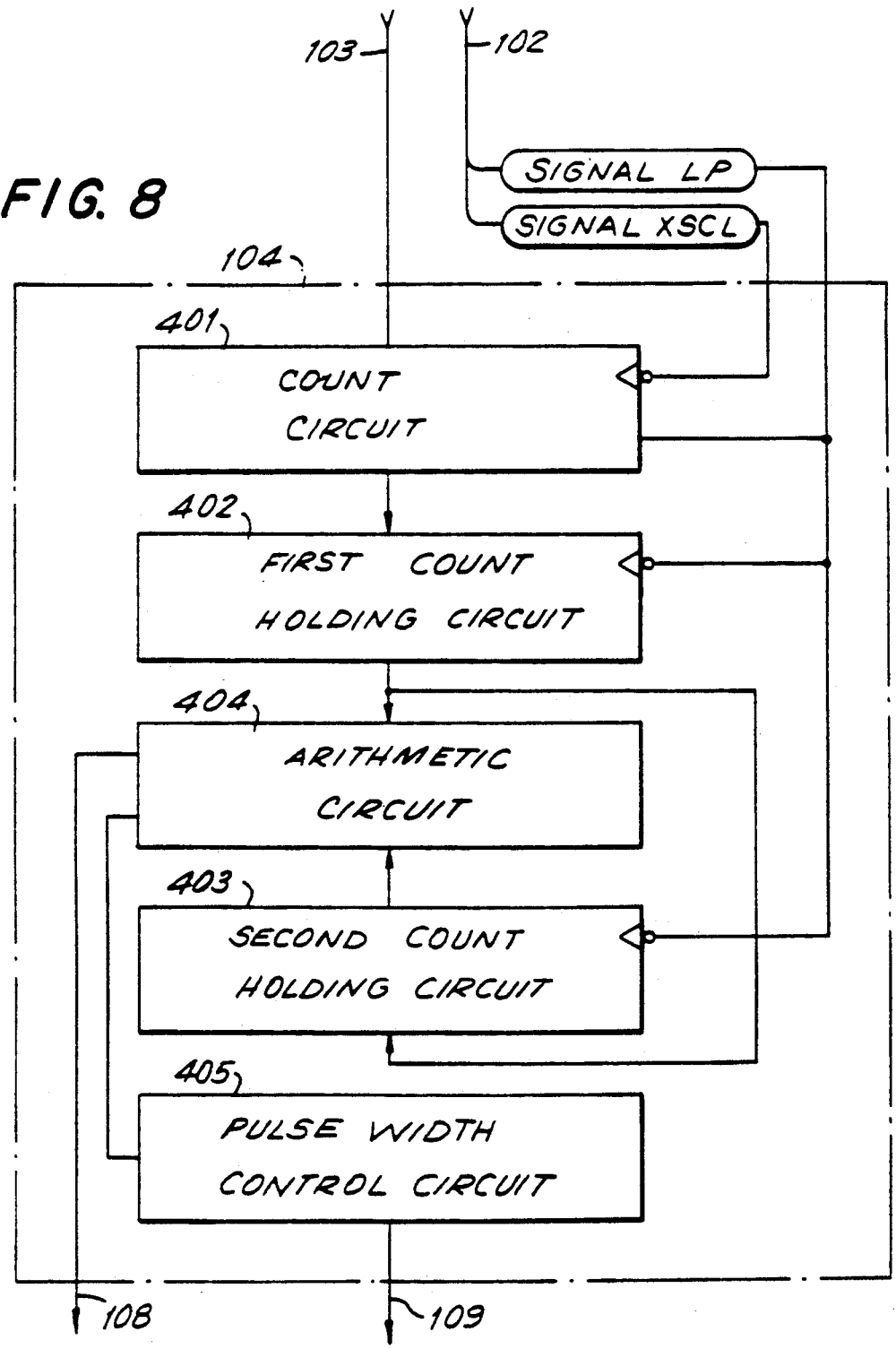
FIG. 8 is a block diagram of a compensation circuit in accordance with the present invention.

Reference is now specifically made to FIG. 8 in which a block diagram of compensation circuit 104 is provided. A count circuit 401 receives data signal 103 and counts the number of ON dots within the display dots 204 on the (n + 1)th scanning electrode during the period when the nth scanning electrode of the liquid crystal panel 201 is selected. Counter circuit 401 counts the number of ON dots on the (N + 1)th scanning electrode by counting the number of dots from the falling edge of signal LP of control signal 102 to the falling edge of the next signal LP when data signal 103 is active at the falling edge of signal XSCL. The count value of the counter circuit 401 is reset to zero, while the discrete counted value is output to a first counter holding circuit 402 at the time of falling edge of signal LP. The counting is begun again and repeats successively. It is not always necessary to count every dot unit if circumstances require, for example, if the number of signal electrodes X1 through X6 were as high as 640, there is no noticeable loss in performance even with a counting error set as high as 16 dots.

First counter holding circuit 402 receives the count value just before the count value of counter circuit 401 becomes zero at the falling edge of signal LP. At the same time, a second counter holding circuit 403 receives the count value from first counter holding circuit 402, wherein the discrete value is transferred just before first counter holding circuit 402 receives the next count value from counter circuit 401, at the falling edge of the signal LP. Accordingly, when first counter holding circuit 402 receives the number of ON dots $M_{ON}$ of display dots 204 on the (n + 1)th scanning electrode, second counter holding circuit 403 receives the number of ON dots $N_{ON}$ of display dots 204 on the nth scanning electrode.

First counter holding circuit 402 and second holding counter circuit 403 output their respective $M_{ON}$ and $N_{ON}$ values to an arithmetic circuit 404. Arithmetic circuit 404 calculates the difference between the value of $M_{ON}$ and $N_{ON}$ produced from first and second counter holding circuits 402 and 403, namely $I = N_{ON} - M_{ON}$, and outputs the sign of I as sign signal 108, and at the same time, the absolute value of parameter I is output to a pulse width control circuit 405.

Pulse width control circuit 405 outputs the active signal for a period corresponding to the absolute value of parameter I, which is input from the arithmetic circuit 404, as strength signal 109. Pulse width control circuit 405 outputs strength signal 109 at the falling edge of signal LP. However, the above signal is not output at the falling edge of signal LP when the signal FR is changing.

The width W of strength signal 109 is related to the absolute value of parameter I through an increment function: $W = a_k \times I^k + b_k \times I^k$, where $a_k$ and $b_k$ are constants and K is 0, 1, 2, 3 . . . . The above width W can be differentiated for both positive and negative values of parameter I. In this embodiment, $W = a_1 \times I$ and is defined regardless of whether the value of parameter I is positive or negative.

Figure 9:
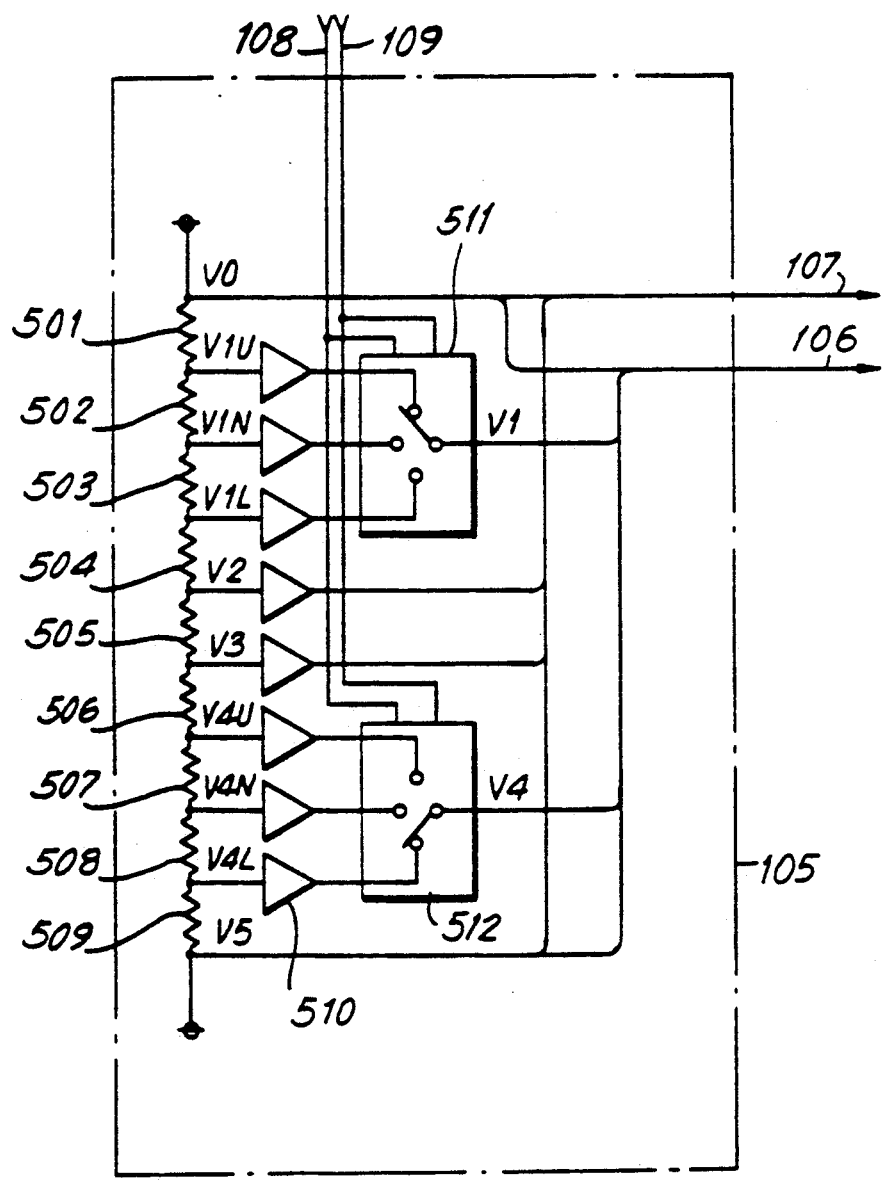
FIG. 9 is a circuit diagram of the power circuit in accordance with the present invention.

Reference is now specifically had to FIG. 9 in which a circuit diagram of the voltage power circuit 105 is provided. A plurality of resistors 501 through 509 are serially connected and a voltage V0 and a voltage V5 are supplied at the ends of the resistors providing a series of voltage dividers thereof. If the resistance value of each resistor 501 through 509 are defined as R1 through R9, respectively, the relation is $$R1 = R9 \quad R2 = R8$$
$$R3 = R7, \quad R4 = R6$$

and;

$$R1 + R2 = R3 + R4 = R9 + R8 = R7 + R6$$
$$= R5/(n - 4).$$

(n is a constant)

Therefore, if the voltage at the end of each respective resistor 501 through 509 is defined as V0, V1U, V1N, V1L, V2, V3, V4U, V4N, V4L, and V5, the following relationships occur.

$$V0 - V1N = V1N - V2 = V4N - V5 = V3 - V4N$$
$$= (V2 - V3)/(n - 4)$$

$$K1 = (V1U - V1N)/(V0 - V1N)$$
$$= (V4N - V4L)/(V4N - V5)$$
$$K2 = (V1N - V1L)/(V0 - V1N)$$
$$= (V4U - V4N)/(V4N - V5) \quad (n \text{ is a constant}).$$

Wherein, the resistance value of each resistor 501 through 509 is set so that the relation of K1 and K2 satisfies the condition:

$$0 < K2, K1 \leq 1.$$

A respective voltage circuit 510 for stabilizing divided voltages V1U, V1N, V1L, V2, V3, V4U, V4N, and V4L formed by each resistor 501 through 509, is provided at the junction of the respective resistors, having the same voltage as the input voltage but having a low impedance. In an exemplary embodiment stabilizing circuit 510 includes an operational amplifier having a voltage follower circuit construction.

A switch 511 and a switch 512 are provided. Both receive sign signal 108 and strength signal 109 as inputs. Switches 511 and 512 are switched in accordance with the inputs of sign signal 108 and strength signal 109. Switch 511 selects between voltage inputs V1U, V1N and V1L, while switch 512 selects between V4U, V4N and V4L. Where strength signal 109 is active and sign signal 108 is positive, switches 511 and 512 are switched to the voltage V1U and the voltage V4L, respectively. When strength signal 109 is active and sign signal 108 is positive, switches 511 and 512 are switched to the voltage V1L and the voltage V4U, respectively. When strength signal 109 is passive, switches 511 and 512 are switched to the voltage V1N and the voltage V4N, respectively. Each voltage is output from switches 511 and 512 as the output voltages V1 and V4, respectively. Voltages V1 and V4, and the voltages V0 and V5 are output as Y power source 106. Additionally, the voltages V0, V2, V3, and V5 are output as the X power source 107. Accordingly, Y power source 106 is comprised of the voltages V0, V1, V4, and V5; the X power source is comprised of the voltages V0, V2, V3, and V5. The voltages are output to liquid crystal unit 101 as a combination of two groups of voltages.

Namely, one set of voltages is as follows.

The voltage V0 of Y power source 106 (selected voltage)

The voltage of V4 of Y power source 106 (non-selected voltage)

The voltage V5 of X power source 107 (ON voltage)

The voltage V3 of X power source 107 (OFF voltage)

The other set of voltage is as follows.

The voltage V5 of Y power source 106 (selected voltage)

The voltage V1 of Y power source 106 (non-selected voltage)

The voltage V0 of X power source 107 (ON voltage)

The voltage V2 of X power source 107 (OFF voltage)

Switching between the two sets of voltages is periodically controlled by signal FR of control signal 102 in the common electrode driving circuit 205 and the segment electrode driving circuit 208.

According to the above structure, when parameter I has a positive value and the selection between scanning electrodes Y1 through Y6 changes from nth electrode to the (n+1)th electrode, Y power source 106 outputs voltages V1U and V4L during the period corresponding to absolute value of parameter I. When the value of parameter I is negative, Y power source 106 outputs voltages of V1L and V4U to the liquid crystal unit 101 during the period corresponding to the absolute value of parameter I. Further, the voltages V1N and V4N are output as voltages V1 and V4 when strength signal 109 is passive including when parameter I equals zero.

Figure 10:
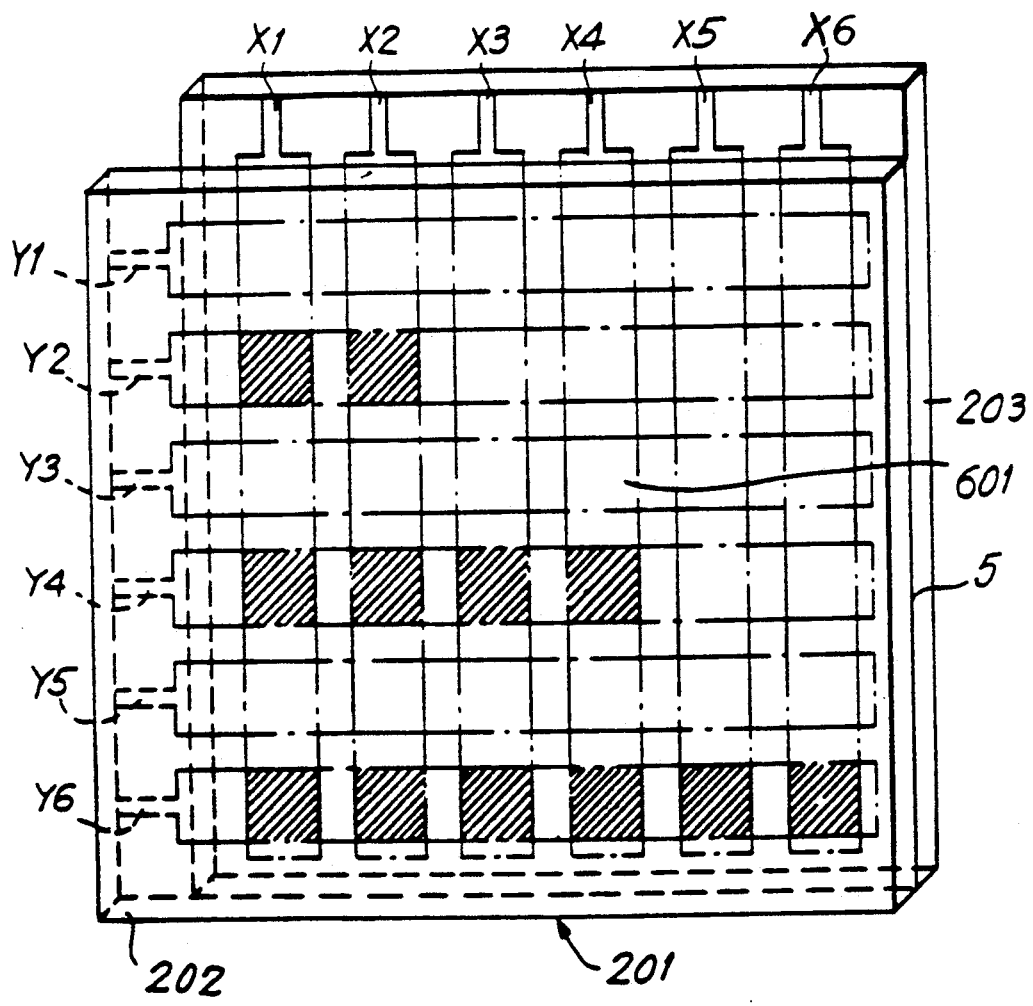
FIG. 10 is a perspective view of a liquid crystal panel.
Figure 11A:
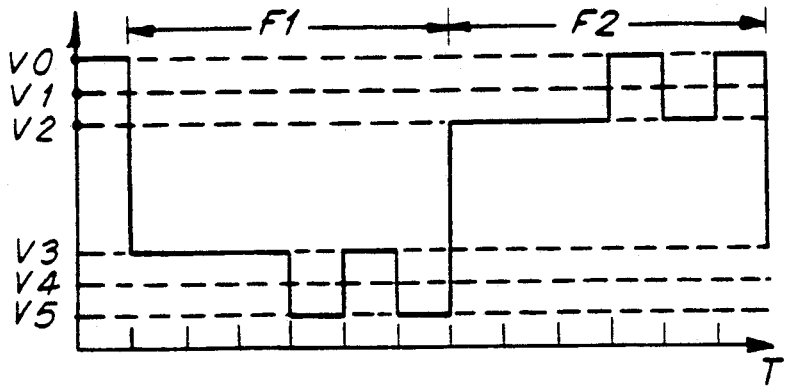
FIGS. 11(a)–11(c) are graphs of the driving waveforms applied to a signal electrode, scanning electrode and across a display dot of th of FIG. 10, respectively.
Figure 11B:
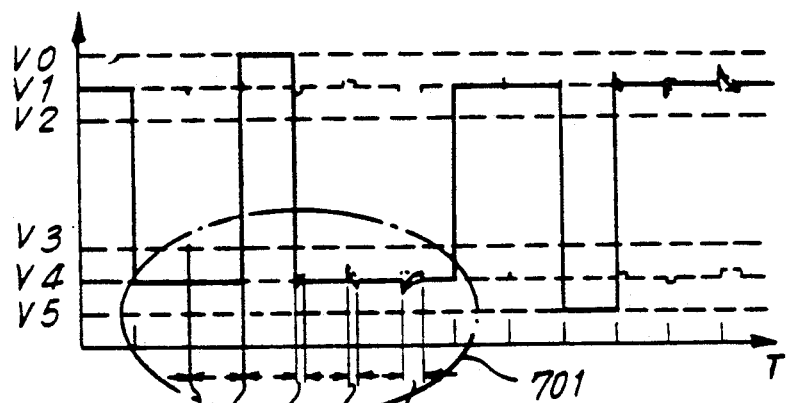
Figure 11C:
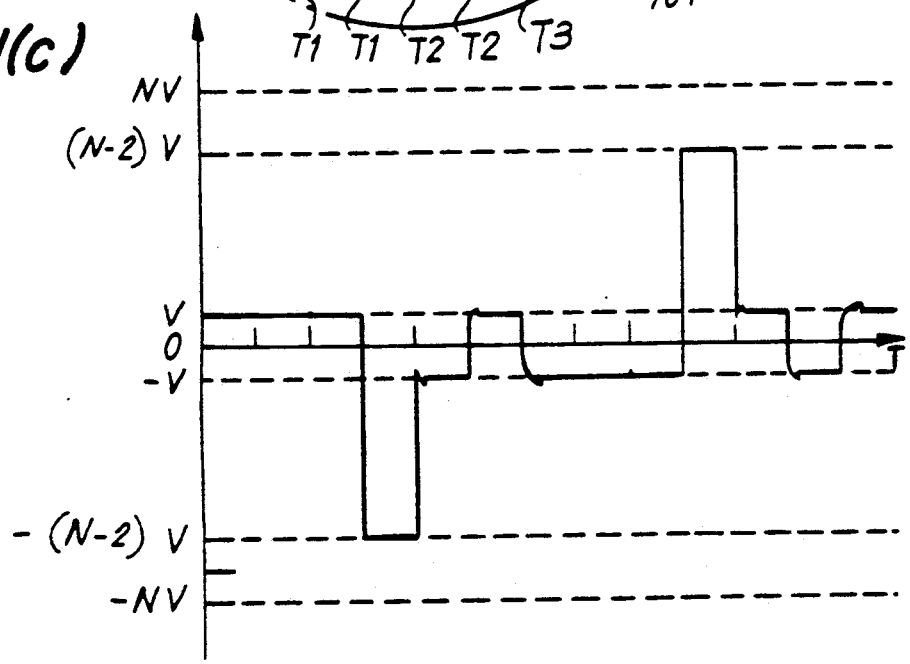
Figure 12:
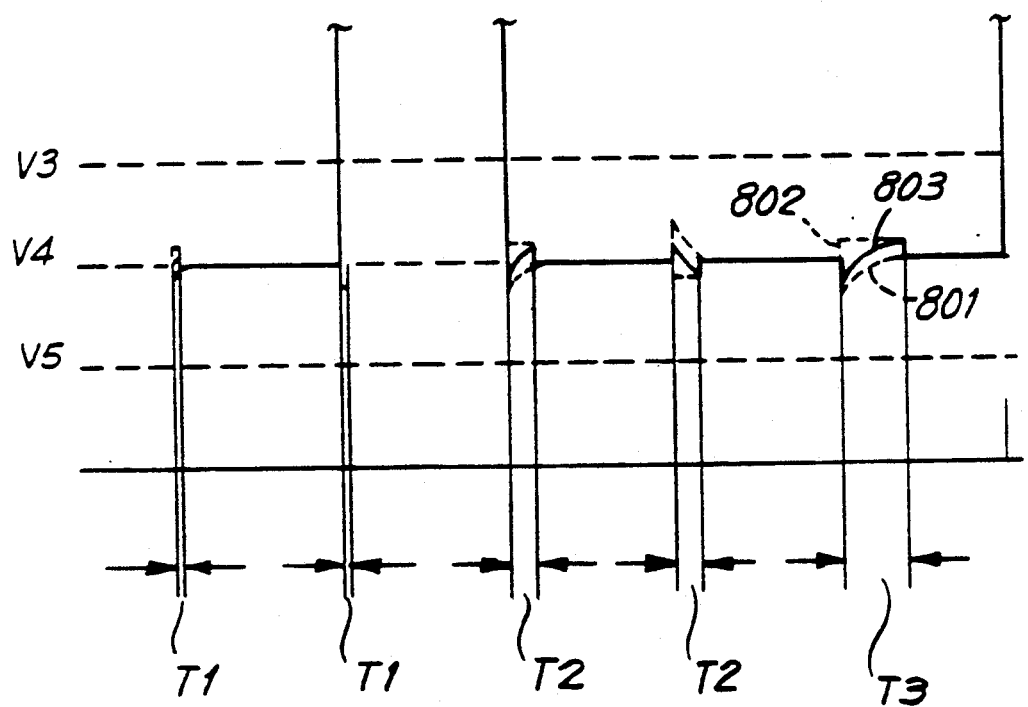
FIG. 12 is a partially exploded view of the waveform of FIG. 11(b).

Reference is now made to FIGS. 10 through 12 in which a display and input waveforms for forming the display are provided. FIGS. 11(a)-11(c) show one example of the voltage waveform applied to form the displayed pattern of FIG. The waveform of FIG. 11(a) is the voltage waveform which is applied to signal electrode X4 for forming display dot 601. FIG. 11(b) is the voltage waveform which is applied to scanning electrode Y3 for forming display dot 601. FIG. 11(c) shows the combination voltage waveform derived from FIGS. 11(a), 11(b) which is applied to display dot 601.

The voltages indicated by the dashed lines in FIGS. 11(a) and 11(b) indicate voltages V0, V2, V3, and V5 of X power source 107 and voltages V0, V1, V4 and V5 of Y power source 106.

Reference is made to FIG. 12 in which the portion indicated by the circled area 701 in FIG. 11(b) is shown. A spike shaped noise voltage 801 tends to occur in the scanning electrode. A changeable non-selected voltage 802 is formed by Y power source 106. Voltages 801 and 802 are combined to form voltage 803.

When the pattern of FIG. 10 is displayed, the parameter I between the number of ON dots $N_{ON}$ on the nth scanning electrode and the number of ON dots $M_{ON}$ on the (n+1)th scanning electrode at the time of changing the selection from the nth scanning electrode to (n+1)th scanning electrode is as follows. When the selection moves from the first scanning electrode Y1 to the second scanning electrode Y2, I=−2; when the selection moves from the second scanning electrode Y2 to the third scanning electrode Y3, I=2; when the selection moves from the third scanning electrode Y3 to the fourth scanning electrode Y4, I=−4; when the selection moves from the fourth scanning electrode Y4 to the fifth scanning electrode Y5, I=4; when the selection moves from the fifth scanning electrode Y5 to the sixth scanning electrode Y6, I=−6; and when the selection moves from the sixth scanning electrode Y6 to the first scanning electrode Y1, I=6.

Thus, in accordance with changes from electrode Y1 to electrode Y2, electrode Y2 to electrode Y3, electrode Y3 to electrode Y4 and so on, the noise voltage 801 increases. However, the period for which the non-selected voltage 802 changes in the direction opposed to the noise voltage 801 increases from T1 to T3, so that combined voltage 803 is compensated. Therefore, the voltage applied to display dot 601 is compensated, thereby realizing an improved display without zebra crosstalk. As mentioned above, when the selected scanning electrode switches from the nth scanning electrode to the (n+1)th scanning electrode of liquid crystal panel 201, the non-selected voltage of Y power source 106 is changed for a period in accordance with the parameter I between the number of ON dots on the nth scanning electrode and the number of ON dots on the (n+1)th scanning electrode, thereby providing an improved display without zebra crosstalk.

The invention therefore provides a structure for changing the period in which the non-selected voltage is increased or decreased to perform compensation (i.e. time base compensation of the non-selected voltage).

As now can be readily appreciated, in accordance with the invention, a method for driving a liquid crystal display device produces a substantially uniform tone pattern by placing in the same display state during each frame all display dots which are associated with the same scanning electrode in producing the tone pattern and adjusting the scanning waveform applied to each scanning electrode during each frame based on the tone pattern. The desired tone value can be set based on the number of frames to be lit within one period. A plurality of different tone values can be displayed by increasing or decreasing the total number of frames in one period and the number of such frames to be lit.

It is also to be understood that the timing and/or number of polarity inversions ar not limited to the embodiment described heretofore and merely represents one example for substantially avoiding application of a D.C. voltage to the liquid crystal panel. In particular, in accordance with the invention, the polarity inversions need not occur in the middle of each frame.

As described heretofore, constant correction non-selecting voltages are applied for a duration of time based on the magnitude of parameter I or parameter F. The adjustment to the scanning waveform applied to each scanning electrode during each frame based on the tone pattern is not limited to the method described heretofore. More particularly, other methods for adjusting the scanning voltage waveform applied to each scanning electrode in accordance with the invention are disclosed in, but not limited to, examples 2-6, 13 and 14 of Japanese Patent Application No. 63-159914.

The invention provides a substantially uniform tone display by combining a method for changing a driving waveform applied to a liquid crystal panel based on the display patterns to be displayed on the panel and a method which places the display dots which are associated with the same scanning electrode in producing a tone pattern during each frame of the period in the same display state.

It will thus be seen that the objects set forth and those made apparent from the preceding description are efficiently attained and, since certain changes may be made in the above method and construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

What is claimed is:

1. A method for driving a liquid crystal display device for producing a tone pattern, said display device including a plurality of signal electrodes overlapping a plurality of scanning electrodes and a plurality of display dots arranged in a matrix of rows and columns in which each display dot corresponds to the overlapping of one of the plurality of signal electrodes with one of the plurality of scanning electrodes, said method including driving each display dot into a lit or non-lit display state during each frame of an at least two frame cycle based on a scanning waveform and signal waveform being applied to the associated scanning electrode and signal electrode, respectively, and further comprising the steps of:

placing in the same display state all display dots producing the tone pattern which are associated with the same scanning electrode during one frame of the cycle; and concurrently adjusting the scanning waveform applied to each scanning electrode during said one frame based on the tone pattern.

2. The method of claim 1, wherein the steps of claim 1 are repeated for each frame of the cycle.

3. The method of claim 1, wherein the scanning waveform includes a first voltage group and a second voltage group which are alternately applied during each cycle.

4. The method of claim 3, wherein the cycle includes a first frame and a second frame and further including applying the first voltage group to the scanning electrodes during a first portion of the first frame and a last portion of the second frame and the second voltage group during the last portion of the first frame and the first portion of the second frame.

5. The method of claim 4, further including applying the scanning waveform during an additional cycle which includes a third frame and a fourth frame wherein the second voltage group is applied to the scanning electrodes during the first portion of the third frame and the last portion of the fourth frame and th first voltage group is applied to the scanning electrodes during the last portion of the third frame and the first portion of the fourth frame.

6. The method of claim 5, wherein the cycle and additional cycles are alternately repeated.

7. The method of claim 1, wherein the step of adjusting occurs when the voltage of the signal waveform changes.

8. The method of claim 3, wherein the step of adjusting occurs when the voltage of the signal waveform changes.

9. The method of claim 8, wherein the step of adjusting also occurs when the scanning waveform changes from one voltage group to another voltage group.

10. The method of claim 1, wherein the step of adjusting is based on a value selected from a pair of parameters I and F, where:

$$I = Y_{i\ lit} - Y_{i+1\ lit}$$

$$F = (Y_{i\ lit} + Y_{i+1\ lit}) - X$$

where
- $Y_{i\ lit}$ is the number of display dots currently lit on a selected scanning electrode
- $Y_{i+1\ lit}$ is the number of display dots to be lit on the next selected scanning electrode
- X is the total number of signal electrodes.

11. The method of claim 10, wherein the step of adjusting includes adding compensating voltages to the scanning waveform, the compensating voltages being based on the magnitude and polarity of the value selected from the pair of parameters I and F.

12. The method of claim 11, wherein the scanning waveform includes a first voltage group and a second voltage group which are alternately applied during each cycle and which are polarity inversions of each other and wherein the value F is selected when the scanning waveform changes from one voltage group to another voltage group and the value of I is selected when the voltage of the signal waveform changes.

13. The method of claim 2, wherein the scanning waveform includes a first voltage group and a second voltage group which are alternately applied during each cycle.

14. The method of claim 13, wherein the cycle includes a first frame and a second frame and further including applying the first voltage group to the scanning electrodes during the first portion of the first frame and the last portion of the second frame and the second voltage group during the last portion of the first frame and the first portion of the second frame.

15. The method of claim 14, further including applying the scanning waveform during an additional cycle which includes a third frame and a fourth frame wherein the second voltage group is applied to the scanning electrodes during the first portion of the third frame and the last portion of the fourth frame and the first voltage group is applied to the scanning electrodes during the last portion of the third frame and the first portion of the fourth frame.

16. The method of claim 15, wherein the cycle and additional cycles are alternately repeated.

17. The method of claim 2, wherein the step of adjusting occurs when the voltage of the signal waveform changes.

18. The method of claim 4, wherein the step of adjusting occurs when the voltage of the signal waveform changes.

19. The method of claim 18, wherein the step of adjusting also occurs when the scanning waveform changes from one voltage group to another voltage group.

20. The method of claim 5, wherein the step of adjusting occurs when the voltage of the signal waveform changes.

21. The method of claim 20, wherein the step of adjusting also occurs when the scanning waveform changes from one voltage group to another voltage group.

22. The method of claim 6, wherein the step of adjusting occurs when the voltage of the signal waveform changes.

23. The method of claim 22, wherein the step of adjusting also occurs when the scanning waveform changes from one voltage group to another voltage group.

24. The method of claim 3, wherein the step of adjusting is based on a value selected from a pair of parameters I and F, where:

$$I = Y_{i\ lit} - Y_{i+1\ lit}$$

$$F = (Y_{i\ lit} + Y_{i+1\ lit}) - X$$

where
- $Y_{i\ lit}$ is the number of display dots currently lit on a selected scanning electrode
- $Y_{i+1\ lit}$ is the number of display dots to be lit on the next selected scanning electrode
- X is the total number of signal electrodes.

25. The method of claim 24, wherein the step of adjusting includes adding compensating voltages to the scanning waveform, the compensating voltages being based on the magnitude and polarity of the value selected from the pair of parameters I and F.

26. The method of claim 25, wherein the value F is selected when the scanning waveform changes from one voltage group to another voltage group and the value of I is selected when the voltage of the signal waveform changes.

27. The method of claim 4, wherein the step of adjusting is based on a value selected from a pair of parameters I and F, where:

$$I = Y_{i\ lit} - Y_{i+1\ lit}$$

$$F = (Y_{i\ lit} + Y_{i+1\ lit}) - X$$

where
- $Y_{i\ lit}$ is the number of display dots currently lit on a selected scanning electrode
- $Y_{i+1\ lit}$ is the number of display dots to be lit on the next selected scanning electrode
- X is the total number of signal electrodes.

28. The method of claim 27, wherein the step of adjusting includes adding compensating voltages to the scanning waveform, the compensating voltages being based on the magnitude and polarity of the value selected from the pair of parameters I and F.

29. The method of claim 28, wherein the value F is selected when the scanning waveform changes from one voltage group to another voltage group and the value of I is selected when the voltage of the signal waveform changes.

30. The method of claim 5, wherein the step of adjusting is based on a value selected from a pair of parameters I and F, where:

$$F = (Y_{i\ lit} - Y_{i+1\ lit}$$

$$F = (Y_{i\ lit} + Y_{i+1\ lit}) - X$$

where
- $Y_{i\ lit}$ is the number of display dots currently lit on a selected scanning electrode
- $Y_{i+1\ lit}$ is the number of display dots to be lit on the next selected scanning electrode
- X is the total number of signal electrodes.

31. The method of claim 30, wherein the step of adjusting includes adding compensating voltages to the scanning waveform, the compensating voltages being based on the magnitude and polarity of the value selected from the pair of parameters I and F.

32. The method of claim 31, wherein the value F is selected when the scanning waveform changes from one voltage group to another voltage group and the value of I is selected when the voltage of the signal waveform changes.

33. The method of claim 3, wherein the first voltage group is a polarity inversion of the second voltage group.

34. The method of claim 7, wherein the step of adjusting occurs when the voltage of the signal waveform changes from a lit to a non-lit level or from a non-lit to a lit level.

35. The method of claim 6, wherein the first voltage group is a polarity inversion of the second voltage group.

36. The method of claim 7, wherein the first voltage group is a polarity inversion of the second voltage group.

37. The method of claim 9, wherein the step of adjusting occurs when the voltage of the signal waveform changes from a lit to a non-lit level or from a non-lit to a lit level.

38. The method of claim 37, wherein the first voltage group is a polarity inversion of the second voltage group.

39. The method of claim 16, wherein the first voltage group is a polarity inversion of the second voltage group.

40. The method of claim 39, wherein the step of adjusting occurs when the voltage of the signal waveform changes from a lit to a non-lit level or from a non-lit to a lit level.

41. The method of claim 23, wherein the first voltage group is a polarity inversion of the second voltage group.

42. The method of claim 41, wherein the step of adjusting occurs when the voltage of the signal waveform changes from a lit to a non-lit level or from a non-lit to a lit level.

43. The method of claim 32, wherein the first voltage group is a polarity inversion of the second voltage group.

44. The method of claim 43, wherein the step of adjusting occurs when the voltage of the signal waveform changes from a lit to a non-lit level or from a non-lit to a lit level.

45. A method for driving a liquid crystal display device for producing a tone pattern, said display device including a plurality of signal electrodes overlapping a plurality of scanning electrodes and a plurality of display dots arranged in a matrix of rows and columns in which each display dot corresponds to the overlapping of one of the plurality of signal electrodes with one of the plurality of scanning electrodes, said method including driving each display dot into a lit or non-lit display state during each frame of an at least two frame cycle based on a scanning waveform and signal waveform being applied to the associated scanning electrode and signal electrode, respectively, and further comprising the steps of:

placing all display dots which produce the tone pattern in the lit state for the same duration of time during the cycle; and concurrently adjusting the scanning waveform applied to each scanning electrode during the cycle based on the tone pattern;

wherein different groups of display dots which produce the tone pattern are placed in the non-lit display state at different portions of the cycle.

46. The method of claim 45, wherein the scanning waveform includes a first voltage group and a second voltage group which are alternately applied during each cycle.

47. The method of claim 46, wherein the cycle includes a first frame and a second frame and further including applying the first voltage group to the scanning electrodes during a first portion of the first frame and a last portion of the second frame and the second voltage group during the last portion of the first frame and the first portion of the second frame.

48. The method of claim 47, further including applying the scanning waveform during an additional cycle which includes a third frame and a fourth frame wherein the second voltage group is applied to the scanning electrodes during the first portion of the third frame and the last portion of the fourth frame and the first voltage group is applied to the scanning electrodes during the last portion of the third frame and the first portion o the fourth frame.

49. The method of claim 48, wherein the cycle and additional cycles ar alternately repeated.

50. The method of claim 45, wherein the step of adjusting occurs when the voltage of the signal waveform changes.

51. The method of claim 50, wherein the step of adjusting also occurs when the scanning waveform changes from one voltage group to another voltage group.

52. The method of claim 45, wherein the step of adjusting is based on a value selected from a pair of parameters I and F, where:

$$I = Y_{i\ lit} - Y_{i-1\ lit}$$

$$F = (Y_{i\ lit} + Y_{i+1\ lit}) - X$$

where $Y_{i\ lit}$ is the number of display dots currently lit on a selected scanning electrode $Y_{i+1\ lit}$ is the number of display dots to be lit on the next selected scanning electrode X is the total number of signal electrodes.

53. The method of claim 52, wherein the step of adjusting includes adding compensating voltages to the scanning waveform, the compensating voltages being based on the magnitude and polarity of the value selected from the pair of parameters I and F.

54. The method of claim 53, wherein the scanning waveform includes a first voltage group and a second voltage group which are alternately applied during each cycle and which are polarity inversions of each other and wherein the value F is selected when the scanning waveform changes from one voltage group to another voltage group and the value of I is selected when the voltage of the signal waveform changes.

55. The method of claim 47, wherein the step of adjusting occurs when the voltage of the signal waveform changes.

56. The method of claim 55, wherein the step of adjusting also occurs when the scanning waveform changes from one voltage group to another voltage group.

57. The method of claim 48, wherein the step of adjusting occurs when the voltage of the signal waveform changes.

58. The method of claim 57, wherein the step of adjusting also occurs when the scanning waveform changes from one voltage group to another voltage group.

59. The method of claim 49, wherein the step of adjusting occurs when the voltage of the signal waveform changes.

60. The method of claim 59, wherein the step of adjusting also occurs when the scanning waveform changes from one voltage group to another voltage group.

61. The method of claim 46, wherein the step of adjusting is based on a value selected from a pair of parameters I and F, where:

$$I = Y_{i\ lit} - Y_{i+1\ lit}$$

$$F = (Y_{i\ lit} + Y_{i+1\ lit}) - X$$

where $Y_{i+1\ lit}$ is the number of display dots currently lit on a selected scanning electrode $Y_{i+1\ lit}$ is the number of display dots to be lit on the next selected scanning electrode X is the total number of signal electrodes.

62. The method of claim 61, wherein the step of adjusting includes adding compensating voltages to the scanning waveform, the compensating voltages being based on the magnitude and polarity of the value selected from the pair of parameters I and F.

63. The method of claim 62, wherein the value F is selected when the scanning waveform changes from one voltage group to another voltage group and the value of I is selected when the voltage of the signal waveform changes.

64. The method of claim 47, wherein the step of adjusting is based on a value selected from a pair of parameters I and F, where:

$$F = (Y_{i\ lit} - Y_{i+1\ lit})$$

$$F = (Y_{i\ lit} + Y_{i+1\ lit}) - X$$

where
$Y_{i\ lit}$ is the number of display dots currently lit on a selected scanning electrode
$Y_{i+1\ lit}$ is the number of display dots to be lit on the next selected scanning electrode
X is the total number of signal electrodes.

65. The method of claim 64, wherein the step of adjusting includes adding compensating voltages to the scanning waveform, the compensating voltages being based on the magnitude and polarity of the value selected from the pair of parameters I and F.

66. The method of claim 65, wherein the value F is selected when the scanning waveform changes from one voltage group to another voltage group and the value of I is selected when the voltage of the signal waveform changes.

67. The method of claim 48, wherein the step of adjusting is based on a value selected from a pair of parameters I and F, where:

$$I = Y_{i\ lit} - Y_{i+1\ lit}$$

$$F = (Y_{i\ lit} + Y_{i+1\ lit}) - X$$

where
$Y_{i\ lit}$ is the number of display dots currently lit on a selected scanning electrode
$Y_{i+1\ lit}$ is the number of display dots to be lit on the next selected scanning electrode
X is the total number of signal electrodes.

68. The method of claim 67, wherein the step of adjusting includes adding compensating voltages to the scanning waveform, the compensating voltages being based on the magnitude and polarity of the value selected from the pair of parameters I and F.

69. The method of claim 68, wherein the value F is selected when the scanning waveform changes from one voltage group to another voltage group and the value of I is selected when the voltage of the signal waveform changes.

70. The method of claim 46, wherein the first voltage group is a polarity inversion of the second voltage group.

71. The method of claim 50, wherein the step of adjusting occurs when the voltage of the signal waveform changes from a lit to a non-lit level or from a non-lit to a lit level.

72. The method of claim 49, wherein the first voltage group is a polarity inversion of the second voltage group.

73. The method of claim 50, wherein the first voltage group is a polarity inversion of the second voltage group.

74. The method of claim 51, wherein the step of adjusting occurs when the voltage of the signal waveform changes from a lit to a non-lit level or from a non-lit to a lit level.

75. The method of claim 74, wherein the first voltage group is a polarity inversion of the second voltage group.

76. The method of claim 60, wherein the first voltage group is a polarity inversion of the second voltage group.

77. The method of claim 76, wherein the step of adjusting occurs when the voltage of the signal waveform changes from a lit to a non-lit level or from a non-lit to a lit level.

78. The method of claim 69, wherein the first voltage group is a polarity inversion of the second voltage group.

79. The method of claim 78, wherein the step of adjusting occurs when the voltage of the signal waveform changes from a lit to a non-lit level or from a non-lit to a lit level.

80. The method of claim 47, wherein the first portion and last portion of each frame are equal to half the frame.

81. The method of claim 48, wherein the first portion and last portion of each frame are equal to half the frame.

* * * * *